(12) United States Patent
Demizu et al.

(10) Patent No.: US 7,990,376 B2
(45) Date of Patent: Aug. 2, 2011

(54) DESIGN SUPPORT SYSTEM, METHOD AND STORAGE MEDIUM

(75) Inventors: Kouji Demizu, Kawasaki (JP); Masayuki Kidera, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/411,133

(22) Filed: Mar. 25, 2009

(65) Prior Publication Data

US 2009/0256841 A1    Oct. 15, 2009

Related U.S. Application Data

(63) Continuation of application No. PCT/JP2007/001060, filed on Sep. 28, 2007.

(30) Foreign Application Priority Data

Sep. 29, 2006    (JP) .................................. 2006-319596

(51) Int. Cl.
   *G06T 17/00*    (2006.01)
(52) U.S. Cl. .............................. 345/420; 345/440; 703/1
(58) Field of Classification Search ........................ None
    See application file for complete search history.

(56) References Cited

U.S. PATENT DOCUMENTS

| 6,636,802 B1 | 10/2003 | Nakano et al. |
| 2003/0020711 A1 | 1/2003 | Sakakura et al. |

FOREIGN PATENT DOCUMENTS

| JP | 03-127272 | 5/1991 |
| JP | 2001-251741 | 9/2001 |
| JP | 2002-99207 | 4/2002 |
| JP | 2003-141197 | 5/2003 |
| WO | WO2004/104868 | 12/2004 |

*Primary Examiner* — Said Broome
(74) *Attorney, Agent, or Firm* — Fujitsu Patent Center

(57) ABSTRACT

An editing process including generation, modification, and deletion of pass points through which a linear structure such as a wire harness or the like should pass in a virtual space is performed in accordance with an operation of an input device by a user, a position of a pass point generated in the editing process is managed by using a plurality of position references to identify the position, and priority of the plurality of position references for each pass point are managed and a position of a pass point whose position has to be changed by an editing process is managed in accordance with the priority when the editing process is performed in accordance with an operation of the input device by a user.

14 Claims, 30 Drawing Sheets

 PASS POINT HAVING REFERENCE MODEL
 PASS POINT OF REFERENCE POSITION
 PASS POINT OF RELATIVE POSITION
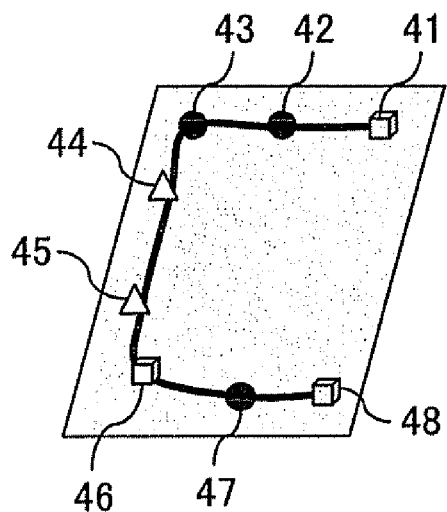
FIG. 4

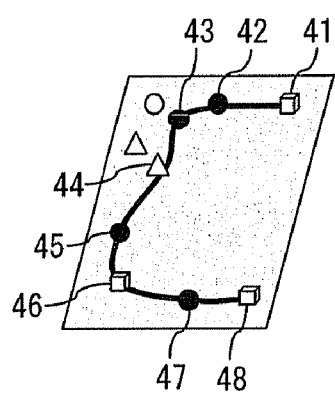 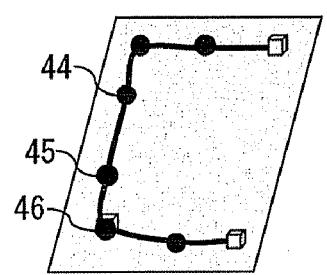 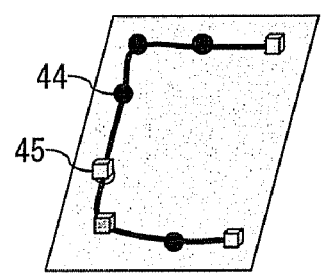
F I G. 6 A    F I G. 6 B    F I G. 6 C

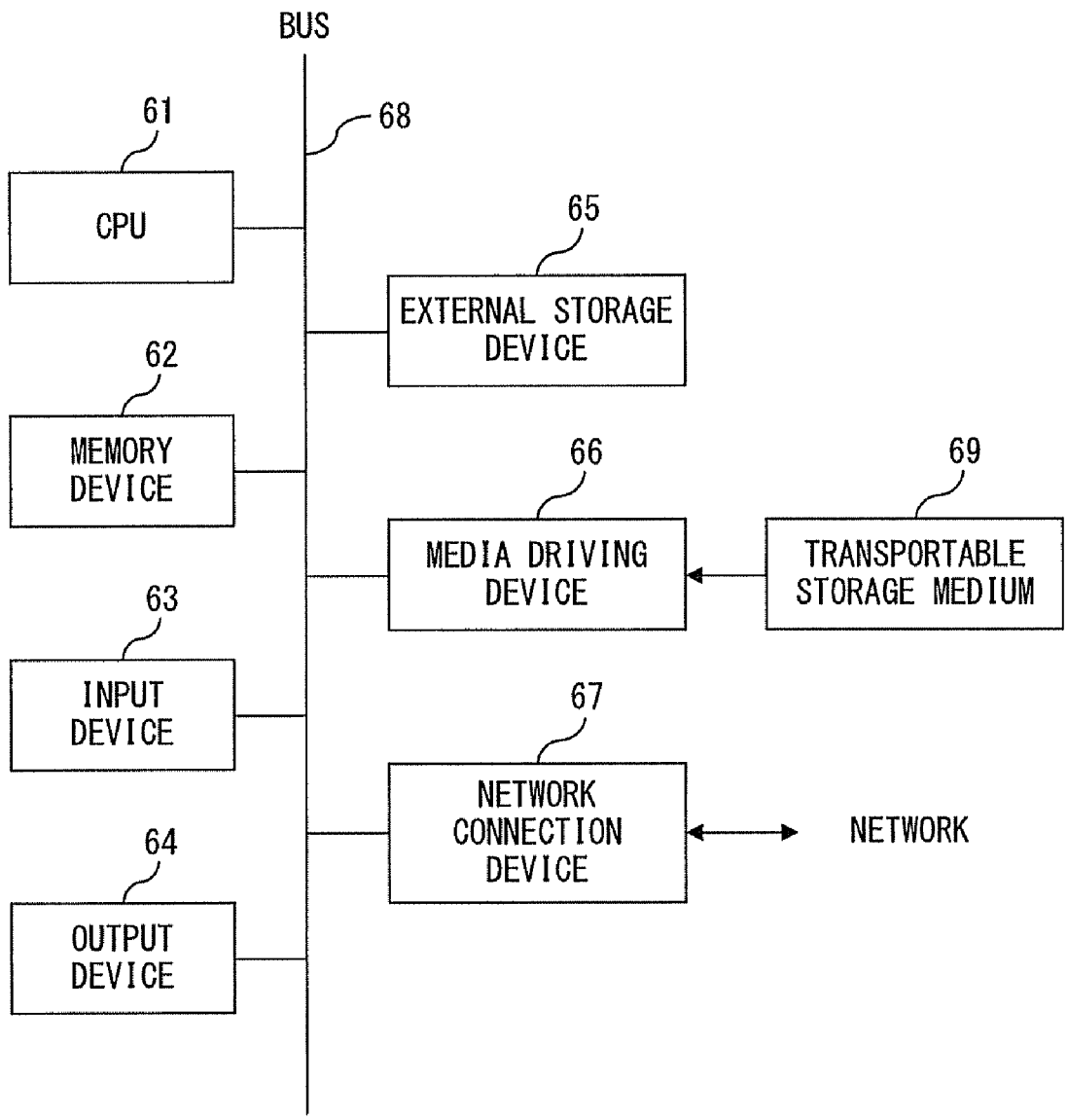
F I G. 1 1

| PASS POINT NUMBER | 1 | 2 | 3 | 4 |
|---|---|---|---|---|
| RELATIVE POSITION COORDINATES (A) | H1 | PASS POINT NUMBER 01 | PASS POINT NUMBER 02 | PASS POINT NUMBER 03 |
| RELATIVE POSITION (X1, Y1, Z1, RXb, RYb, RZb) | 30, 40, 40, 0, 0, 0 | 20, 0, 40, 0, 0, 0 | 20, 0, -70, 0, 0, 0 | 20, 0, 50, 0, 0, 0 |
| REFERENCE POSITION COORDINATES (B) | H1 | H1 | H1 | H1 |
| REFERENCE POSITION (X, Y, Z, RXa, RYa, RZa) | 30, 40, 40, 0, 0, 0 | 50, 40, 80, 0, 0, 0 | 70, 40, 10, 0, 0, 0 | 90, 40, 60, 0, 0, 0 |
| REFERENCE MODEL NAME (C) | AAA.prt | – | BBB.prt | – |
| REFERENCE MODEL RELATIVE POSITION | 0, 5, 0 | – | 10, 20, 10 | – |
| PRIORITY 1 | C | A | C | B |
| PRIORITY 2 | A | B | A | A |
| PRIORITY 3 | B | – | B | – |
| WHETHER TO FIX PASSING DIRECTION | ON | OFF | OFF | ON |
| PASSING DIRECTION REFERENCE COORDINATES | AAA.prt | – | – | H1 |
| PASSING DIRECTION RX | 0 | – | – | 0 |
| PASSING DIRECTION RY | 90 | – | – | 0 |
| PASSING DIRECTION RZ | 0 | – | – | 45 |

FIG. 12

| ID | HARNESS REFERENCE COORDINATE ORIGIN FROM ABSOLUTE COORDINATE SYSTEM | NUMBER OF DRAWING | NAME | CONNECTOR (STARTING POINT) | POINT NUMBER | CONNECTOR (ENDING POINT) |
|---|---|---|---|---|---|---|
| Hns001 | 0, 50, 0 | XXXXX-X1 | VGA CABLE | ABC.prt | 1, 2, 3, 4 | CBA.prt |
| Hns002 | 0, 0, 0 | XXXXX-X2 | HDD CABLE | CN1.prt | 1, 2, 3, 4 | CN5.prt |
| Hns003 | 10, 20, 0 | XXXXX-X3 | PWR CABLE | PWR1.prt | 1, 2, 3, 4, 5 | PWR2.prt |

FIG. 13

| ID | CONDITION | COLOR | SHAPE |
|---|---|---|---|
| Display001 | HAVING REFERENCE MODEL/PASSING DIRECTION BEING FIXED | GREEN | QUADRANGLE |
| Display002 | HAVING REFERENCE MODEL/PASSING DIRECTION NOT BEING FIXED | BLUE | QUADRANGLE |
| Display003 | NOT HAVING REFERENCE MODEL/PASSING DIRECTION BEING FIXED | GREEN | CIRCLE |
| Display004 | NOT HAVING REFERENCE MODEL/PASSING DIRECTION NOT BEING FIXED | BLUE | CIRCLE |
| Display005 | RELATIVE POSITION/PASSING DIRECTION BEING FIXED | GREEN | TRIANGLE |
| Display006 | ELATIVE POSITION/PASSING DIRECTION NOT BEING FIXED | BLUE | TRIANGLE |

F I G. 1 4

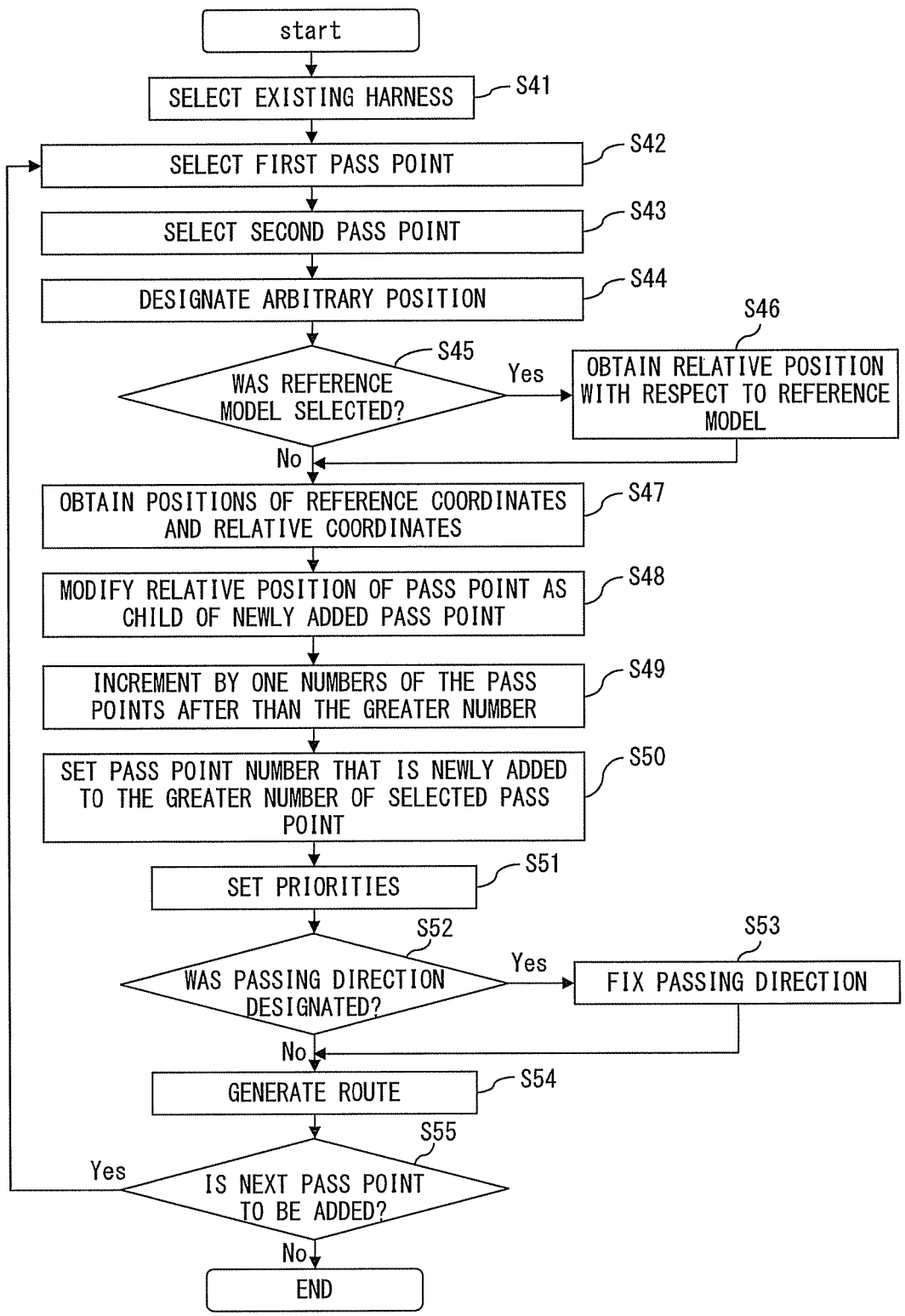
F I G. 1 7

FIG. 20

HARNESS LIST

EDIT(E) DISPLAY(V)

HARNESS LIST

| No | NAME OF HARNESS | DESTINATION CONNECTOR |
|---|---|---|
| 1 | Hns0001 | |

DETAIL

| No. | LENGTH (mm) | DIAMETER (mm) | DESIGNATED MINIMUM CURVATURE |
|---|---|---|---|
| 1 | 390.034 | 1.000 | |

EXPAND >>

OK

CANCEL

INFLUENCE ON POSITION OF PASS POINT

|1| NOT INFLUENCED BY OTHERS (POSITION WITH RESPECT TO REFERENCE)

|2| INFLUENCED BY PREVIOUS PASS POINT (RELATIVE POSITION)

○ INFLUENCED BY REFERENCE COMPONENT

NAME OF REFERENCE COMPONENT NAME [        ] [SELECT]

F I G. 2 4

INFLUENCE ON POSITION OF PASS POINT

- [3] NOT INFLUENCED BY OTHERS (POSITION WITH RESPECT TO REFERENCE)
- [2] INFLUENCED BY PREVIOUS PASS POINT (RELATIVE POSITION)
- [1] INFLUENCED BY REFERENCE COMPONENT

NAME OF REFERENCE COMPONENT: AA.prt [SELECT]

F I G. 2 5

PASSING DIRECTION OF HARNESS

● NOT FIXED (NO FIXATION AXIS)

○ FIXED (THREE-AXES FIXATION)

○ FIXED ON PLANE (TWO-AXES FIXATION)

NAME OF REFERENCE COMPONENT [     ] [SELECT]

F I G. 2 6

DESIGN SUPPORT SYSTEM, METHOD AND STORAGE MEDIUM

CROSS REFERENCE TO RELATED APPLICATION

This application is a continuation of International Application No. PCT/JP2007/001060, filed Sep. 28, 2007, and claims the benefit thereof. The International Application claims the benefit of International Application No. PCT/JP2006/319596, filed on Sep. 29, 2006, both applications are incorporated by reference herein in their entirety.

TECHNICAL FIELD

The present invention relates to a technology of supporting a route design operation for deformable linear structure (e.g., wiring harness) used in apparatuses such as electronic products, automobiles, etc., or used for connecting a plurality of apparatuses disposed in separate places.

BACKGROUND ART

Some products use wiring harness (called harness hereinafter) as electric wires. Harness is deformable, and can be obtained by processing wires or cables. Most apparatuses using a plurality of components, such as automobiles or the like need harnesses. Thus, software for supporting route-design operations of laying harness (referred to as route-design support software hereinafter) has been marketed in recent years. CAD (computer aided design) has been widely introduced to manufacturing industries, and accordingly route-design support software usually uses design data of an apparatus in order to design the routes of the harnesses to be laid in the apparatus in a virtual space. A design support system for supporting the route-design operation of laying harnesses is realized by implementing the route-design support software on a data processing apparatus (computer).

Harness is highly flexible. However, when a product is designed without considering harness, matters concerning harness sometimes require a design modification. This problem occurs because undesirable situations that can accompany the use of harness are easily overlooked. Examples of such undesirable situations include having to bend harness forcibly, installation work characteristics are bad or having harnesses interfere with other components. The route design using design data makes it possible to easily avoid this kind of situation being overlooked.

In a route design operation using a design support system, pass points, through which harness need to pass, are designated. When a position of a pass point is to be designated in conventional method of designating pass points, a position reference, which is a position serving as a reference for determining the position of the pass point being designated, is selected as an attribute of the pass point being designated. Examples of position references include a reference based on the origin of a coordinate system in a virtual space (called reference coordinates hereinafter), a reference based on another pass point (called relative coordinates hereinafter), and a reference based on a component (model) disposed in a virtual space (called a model reference hereinafter). These position references are referred to in order to identify positions of pass points, and accordingly they are called "reference destination" herein. The above coordinate system is defined on the basis of the target scope of the route design. The entire apparatus is managed by using another coordinate system (called an absolute coordinate system).

Not all of designated pass points are always appropriate. Also, the arrangement or types of other components may be changed. Thus, routes are designed in such a manner that the routes can be modified after their design is completed. In other words, users (persons who designed the routes) can arbitrarily add and delete pass points, and also can change their positions.

Conventional design support systems do not allow users to change the attributes (position references), forcing users to delete undesirable pass points and add a new pass points in order to change the attribute of the undesirable pass point. Thus, designing routes has not been an easy operation, and this has been problematic.

A position of a pass point is influenced as below by editing operations such as addition, deletion, or changing the position (position change) of other pass points, depending on the position reference designated as an attribute.

A pass point based on reference coordinates is not influenced by the addition, deletion, or position change of any pass points. It is not influenced by the exchange of components or the position change of components either. Accordingly, the position change requires the position change (editing) of the pass point itself.

The position of a pass point based on relative coordinates is changed in accordance with a change of the position of another pass point serving as the reference of the pass point. When there is still another pass point referring to thus position-changed pass point, the position of that pass point is changed as well. In other words, when pass points are successive in a relative coordinate system and a position of one of the successive pass points is changed, the positions of all the subsequent pass points are changed in accordance with the first position change of a pass point. Accordingly, a position change of one pass point can automatically cause position changes for a plurality of pass points (FIG. 29). Hereinafter, a pass point serving as a reference for pass points based on relative coordinates is called a "parent", a pass point based on relative coordinates referring to the parent is called a "child", and a pass point based on relative coordinates referring to the child is called a "grandchild".

The position management of pass points of relative coordinates consists of storing relative positions with respect to parent pass points. Thus, when a parent pass point is deleted, the information of the parent pass point is stored in order to permit the identification of the position of a child pass point. When a new pass point is to be added between child and parent pass points, the new pass point being added is made to be a parent, or to add other new pass point that the parent is the new pass point.

A position of a pass point of a model reference is changed in accordance with a change of a position or an orientation of a designated component. Accordingly, a position change has to consist of a change of a relative position with respect to a component or a change of a position/orientation of the component itself. An exchange of a designated component for another one makes it impossible to identify the positions of pass points because the designated component serves as a reference. As a result, another component has to be designated or a new pass point has to be generated.

FIG. 29 illustrates a conventional technique of displaying pass points and position changes made to pass points of relative coordinates. In FIG. 29, a harness is provided between components A and B, and five pass points with pass point numbers 01 through 05 are set between components A and B. Pass points with pass point numbers 01 through 04 are of relative coordinates, and the pass point with pass point number 05 is of a model reference. The pass point with pass point number 01 (the first pass point) is a parent of the pass points with pass point numbers 02 and 04, and the pass point with pass point number 02 is a parent of the pass point with pass point number 03. Thereby, the positions of the pass points with pass point numbers 02 through 04 are automatically changed in accordance with the position change of the pass point with pass point number 01. The pass point with pass point number 05 refers to component D as a reference, i.e., a reference model, and accordingly the original position of the pass point with pass point number 05 is not changed even when the position of the pass point with pass point number 01 is changed. The same symbols (black circles) are used to express the pass points with pass point numbers 01 through 05 in FIG. 29.

As described above, when a position of one pass point is edited, positions of other pass points are influenced in accordance with the position reference set as an attribute. Accordingly, users select a position reference taking this influence into consideration. However, in the conventional method, the same symbols (black circles in this example) have been used to display pass points regardless of their position references (attributes), as illustrated in FIG. 29. Accordingly, it has been difficult to find which pass point will have the position influenced by the editing of other pass point, which is problematic.

When it is difficult to find which pass point will have the position influenced, a longer time is required to confirm the position of the pass point, which prevents smooth operations. Also, the relationship between a pass point based on a model reference and a designated component is difficult to understand, making it difficult to design routes. Therefore, above problem is form not to be able to perform the route design easily.

Long harnesses have to be fixed at plural points. The fixation of a harness limits the directions in which the harness can pass. Accordingly, passing directions are designated for pass points of a model reference in the conventional method.

Passing directions are influenced by the reference components. Specifically, a change to the orientation of the component changes the passing direction. When a passing direction is changed significantly, the route design (arrangement of pass points) of the harness usually has to be significantly modified. Accordingly, route design modifications often have been required by a change in the arrangement of pass points when the arrangement of components is not fixed. This is one of the factors that makes route design operations difficult.

Harnesses themselves are deformable linear structure that can be obtained by processing wires or cables. Not only are thin linear structures such as electric wires, cables (including optical cables), etc., provided to apparatuses, but thick linear structures, which are relatively thick, are also provided. For example, cylindrical linear structures are provided usually to allow fluid (such as air) to flow through the structures themselves or to allow other linear structures to run through the structures themselves.

These linear structures are provided not only between components in one apparatus but also between components disposed in separate places. Thus, routes are sometimes designed in order to provide linear structures between separate components (apparatuses). This means that a target of route design can be not only a single component, but also a plurality of components disposed in separate places. In view of this, it is important that routes be designed easily regardless of the variety of targets.

Patent Document 1

Japanese Laid-open Patent Application Publication No. 2003-141197

Patent Document 2

Japanese Laid-open Patent Application Publication No. 03-127272

Patent Document 3

Japanese Laid-open Patent Application Publication No. 2002-99207

DISCLOSURE OF THE INVENTION

It is an object of the present invention to provide a technique of facilitating route design operations for linear structures such as harnesses or the like to be provided to a target.

A design support system according to a first aspect of the present invention is a design support system for supporting a route design operation for providing a deformable linear structure to a target, said system comprising:

editing means for performing an editing process including generation, modification, and deletion of pass points through which the linear structure should pass in a virtual space in accordance with an operation of an input device by a user;

position management means for managing a position of a pass point generated by the editing means by using a plurality of position references for identifying the position; and a priority management means for managing the priority of the plurality of position references for each pass point, and causing the position management means to manage, in accordance with the priority, a position of a pass point whose position has to be changed by an editing process when the editing means performs the editing process in accordance with an operation of the input device by a user.

In addition to the configuration of the above system of the first aspect, a design support system according to a second aspect of the present invention further comprises:

passing direction management means for managing whether or not to fix a passing direction, for each pass point, of the linear structure passing through the pass point in accordance with an instruction given by a user through an operation of the input device.

In addition to the configuration of the above system of the first aspect, a design support system according to a third aspect of the present invention further comprises:

reference coordinate management means for managing, for each pass point, reference coordinates for identifying a passing direction of the linear structure passing through the pass point in accordance with an instruction given by a user through an operation of the input device.

In addition to the configuration of the above system of the first aspect, a design support system according to a fourth aspect of the present invention further comprises:

display control means for making displayed content of the pass point different in accordance with priorities managed by the priority management means.

A design support method according to a first aspect of the present invention is a method of supporting, by using a computer, a route design operation for providing a deformable linear structure to a target, said method comprising:

performing an editing process including generation, modification, and deletion of pass points through which the linear structure should pass in a virtual space in accordance with an operation of an input device by a user;

managing a position of a pass point generated in the editing process by using a plurality of position references for identifying the position; and managing priority of the plurality of position references for each pass point, and managing, in accordance with the priority, a position of a pass point whose position has to be changed by an editing process when the editing process is performed in accordance with an operation of the input device by a user.

In addition to the steps in the above method of the first aspect, a design support method according to a second aspect of the present invention further comprises:

managing whether or not to fix a passing direction, for each pass point, of the linear structure passing through the pass point in accordance with an instruction given by a user through an operation of the input device.

In addition to the steps in the above method of the first aspect, a design support method according to a third aspect of the present invention further comprises:

managing, for each pass point, reference coordinates for identifying a passing direction of the linear structure passing through the pass point in accordance with an instruction given by a user through an operation of the input device.

In addition to the steps in the above method of the first aspect, a design support method according to a fourth aspect of the present invention further comprises:

managing, for each pass point, an attribute representing a type of the pass point designated by a user through an operation of the input device; and making displayed content of the pass point different in accordance with the attributes.

Storage media according to first through fourth aspects of the present invention are to be used for causing a computer used to construct a design support system for supporting a route design operation for providing a deformable linear structure to a target to implement a design support, and respectively include functions for implementing the above design support systems or the design support methods of the first through fourth aspects.

In the present invention, an editing process including generation, modification, and deletion of pass points through which a deformable linear structure should pass in a virtual space (containing a target) is performed in accordance with an operation of an input device by a user, a position of a pass point generated in the editing process is managed by using a plurality of position references for identifying the position, and priority of the plurality of position references for each pass point are managed, and thereby a position of a pass point whose position has to be changed by the editing process is managed in accordance with the priority when the editing process is performed in accordance with an operation of the input device by a user.

A position of a pass point is managed by using a plurality of position references, making it possible to reliably identify the position even when one of the plurality of position references cannot be used. Priorities are managed in order to manage positions of pass points in accordance with the priorities, making it possible to appropriately use a position reference that should be used. Even when a position reference that should be used cannot be used, another position reference can be used, making it possible to continue the management of position of pass point.

These features make it possible to flexibly respond to a design modification of the apparatus itself. The position reference to be used can be selected by changing priority so that it is not necessary for users to generate a new pass point in order to change position references to be used. A position of a pass point can surely be identified even when the design of the apparatus itself is modified. A situation in which a pass point whose position cannot be identified due to an exchange of parts or the like causing the necessity of an additional pass point is surely avoided. As a result of this, users can design routes more easily. When a target is a plurality of apparatuses that are disposed in different places and treated separately and an arrangement modification of the apparatuses occurs, this arrangement modification can also be responded to appropriately for the same reasons.

In the present invention, whether or not to fix a passing direction of a linear structure passing through a pass point in accordance with an instruction given by a user through an operation of an input device is controlled. Accordingly, in a section in which the directions should be fixed (limited), the directions can be fixed, making it possible to perform a route design in which harnesses in that section are maintained in an appropriate shape. Accordingly, users can design routes more easily.

In the present invention, reference coordinates for identifying a passing direction of a linear structure passing through a pass point are managed for each pass point in accordance with an instruction given by a user through an operation of the input device. Accordingly, a passing direction can be designated arbitrarily at a desired pass point. Further, reference coordinates that allow an easy designation of passing directions can be set for each pass point. Accordingly, users can design routes more easily.

In the present invention, an attribute representing the type of a pass point designated by a user through an operation of the input device is managed for each pass point, and displayed content of each pass point are made different in accordance with the attributes, allowing users to easily understand the attribute of each pass point. Thereby, users can also find pass point that is influenced by the editing of other pass point. Accordingly, users can design routes more easily.

BRIEF DESCRIPTION OF THE DRAWINGS

FIG. 4 illustrates examples of a display of a route design;

FIG. 6A illustrates a change in display content caused by changing priority 1 in a pass point 45 into absolute coordinates from the route design illustrated in FIG. 4 and thereafter changing a position of the pass point 43;

FIG. 6B illustrates a change in display content caused by changing priority 1 of pass points 44 and 46 from the route design illustrated in FIG. 4;

FIG. 6C illustrates a change in display content caused by changing priority 1 of the pass points 44 and 46 from the route design illustrated in FIG. 4;

FIG. 11 illustrates an example of a hardware configuration of a computer capable of implementing a wire harness route generation system including a design support system according to the present invention;

FIG. 12 illustrates a pass point position table;

FIG. 13 illustrates a harness table;

FIG. 14 illustrates a display table;

FIG. 17 illustrates a flowchart for an addition process of a pass point;

FIG. 20 illustrates a harness selection window;

FIG. 24 illustrates a priority menu window (when there is not a reference model);

FIG. 25 illustrates a priority menu window (when there is a reference model);

FIG. 26 illustrates a passing direction menu window;

BEST MODES FOR CARRYING OUT THE INVENTION

Figure 1:
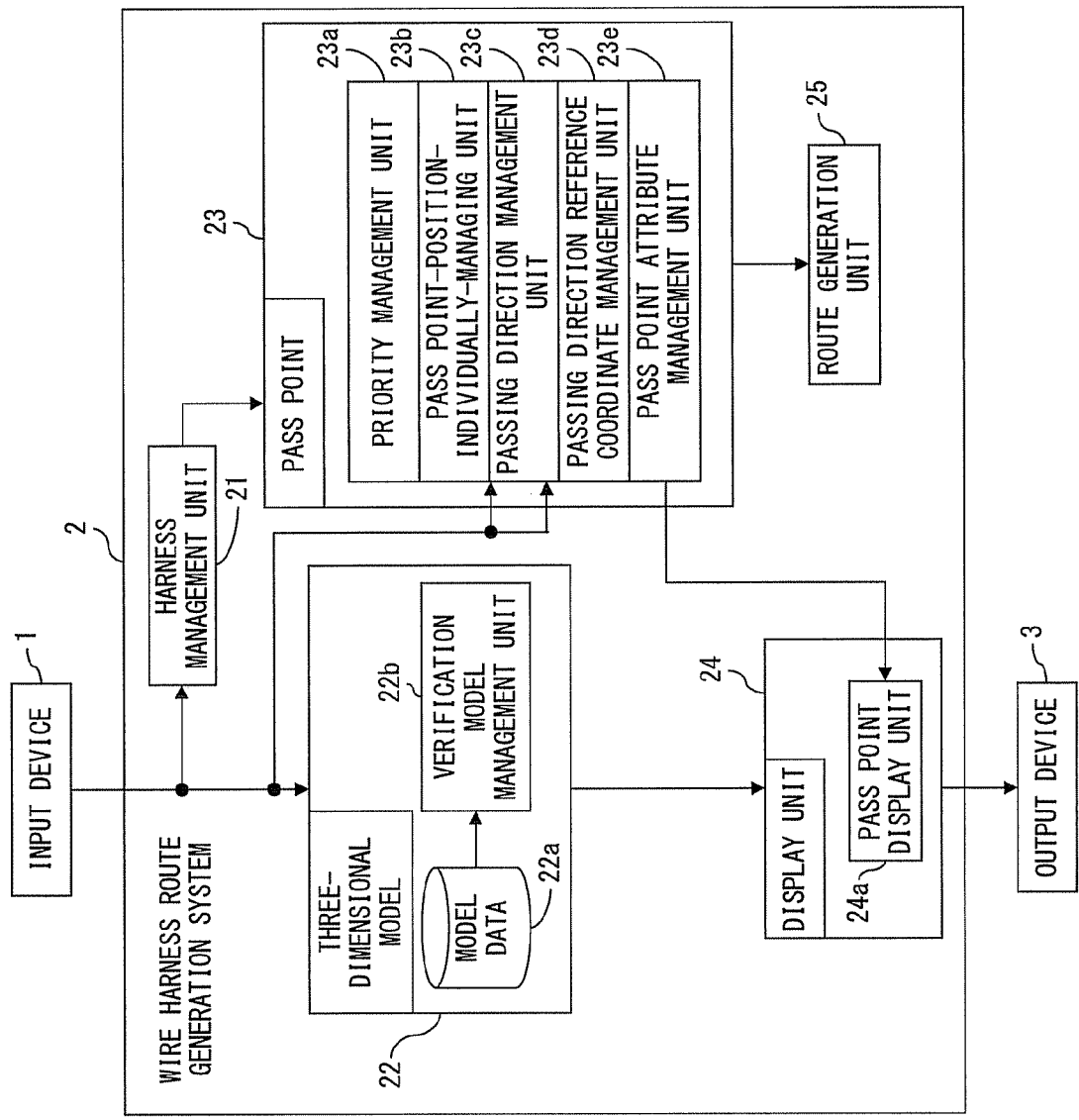
FIG. 1 illustrates functions of a wire harness route generation system including a design support system according to the present embodiment.

Hereinafter, embodiments of the present invention will be explained in detail by referring to the drawings.

FIG. 1 illustrates functions of a wire harness route generation system (hereinafter, called a "generation system") including a design support system according to the present embodiment. A generation system 2 supports operations of a route design that targets flexible harnesses illustrated in FIGS. 9 and 10 as linear structures. The design support system according to the present embodiment is implemented by the generation system 2.

An input device 1 to be operated by users and an output device 3 are connected to the generation system 2. Examples of the input device 1 are a pointing device such a mouse or the like, and a keyboard. An example of the output device 3 is a display device such as a liquid crystal display device, or the like. The generation system 2 edits pass points in accordance with the user's operations input into the input device 1 for designing routes, and displays a result of the editing or the harnesses whose routes have been designed.

The generation system 2 includes a harness management unit 21, a three-dimensional model management unit 22, a pass point management unit 23, a display unit 24, and a route generation unit 25.

The harness management unit 21 manages a route design for each harness. The three-dimensional model management unit 22 manages design data (model data) of components arranged in an apparatus that has been three dimensionally designed. Model data is stored in a model data database (hereinafter, called a "DB") 22a, and is managed by a verification model management unit 22b. The pass point management unit 23 manages pass points in units of a single harness under the control of the harness management unit 21. In addition, the pass point management unit 23 includes a priority management unit 23a, an individual pass-point position managing unit 23b, a passing direction management unit 23c, a passing direction reference coordinate management unit (hereinafter, called a "coordinate management unit") 23d, and a pass point attribute management unit 23e. The display unit 24 displays images on the input device 1. Images for displaying generated pass points are generated by a pass point display unit 24a. A route generation unit 25 generates routes for harnesses.

FIG. 11 illustrates an example of a hardware configuration of a computer capable of implementing the generation system 2. A configuration of a computer capable of implementing the generation system 2 will be explained specifically before FIG. 1 is explained in detail. In order to avoid confusion, explanations below are given on the assumption that the generation system 2 is implemented by a single computer whose configuration is illustrated in FIG. 11.

The computer illustrated in FIG. 11 includes a CPU 61, a memory device 62, an input device 63, an output device 64, an external storage device 65, a media driving device 66, and a network connection device 67 connected to one another via a bus 68. The configuration illustrated in FIG. 11 is an example and the scope of the present invention is not limited to this example.

The CPU 61 controls the computer entirely.

The memory device 62 is a memory device such as a RAM device or the like for temporarily storing programs or data held in the external storage device 65 or a transportable storage medium 69. The memory device 62 stores programs and data when the programs are to be executed or the data is to be updated. The CPU 61 loads the programs into the memory device 62, and reads and executes the loaded programs in order to control the entire computer.

The input device 63 has an interface connected to the input device 1 such as a keyboard, a mouse or the like, or has all these devices. The input device 63 detects operations by users on the input device 1, and reports the detection results to the CPU 61.

The output device 64 includes a display control device connected to, for example, the output device 3 in FIG. 1, or includes these devices. The output device 64 causes the output device 3 in FIG. 1 to display data transferred under the control of the CPU 61.

The network connection device 67 performs communications with external devices via a network such as the Internet, intranet, or the like. An example of the external storage device 65 is a hard disk device. The external storage device 65 is used mainly for storing data and programs.

The media driving device 66 accesses the transportable storage medium 69 such as an optical disk, a magneto-optical disk, or the like.

A result of a route design is stored in the memory device 62 or the external storage device 65. Design data including model data of an apparatus to which harnesses are provided is stored in the external storage device 65 or the transportable storage medium 69. To aid in understanding herein, design data is assumed to be stored in the external storage device 65. In such a case, the DB 22*a* is stored in the external storage device 65.

A design support system (generation system 2) according to the present embodiment is realized by the implementation, by the CPU 61, of programs having functions of the generation system 2 (hereinafter, called "Design support software"). The design support software can be distributed, for example, in the form of the transportable storage medium 69, and can be obtained via the network connection device 67. Herein, the software is assumed to be stored in the external storage device 65.

In the above assumed conditions, the harness management unit 21 is realized by, for example, the CPU 61, the memory device 62, the input device 63, the external storage device 65, and the bus 68. The pass point management unit 23, the route generation unit 25, and the three-dimensional model management unit 22 are realized by, for example, the CPU 61, the memory device 62, the external device 65, and the bus 68. The display unit 24 is realized by, for example, the CPU 61, the memory device 62, the output device 64, the external storage device 65, and the bus 68.

The present embodiment facilitates route design operations in the manner described below. For the explanations below, FIGS. 2 through 8 are referred to.

In the present embodiment, as position references for determining positions of pass points, reference coordinates based on the origin of a coordinate system of a virtual space (containing the target), relative coordinates based on another pass point, and a model reference based on a component (model) disposed in a virtual space are prepared (this is the same as in the conventional methods), and the positions are managed using a plurality of the position references. Specifically, the position management of a pass point for which a model reference is designated uses reference coordinates and relative coordinates in addition to the model reference. The position management of a pass point for which a model reference is not designated uses reference coordinates and relative coordinates. Because positions are managed by using a plurality of position references, priorities are managed as attributes to be used for determining the position reference that is considered effective. Thereby, the position of a pass point for which a model reference, relative coordinates, and reference coordinates are designated (in the order starting from the one with the highest priority) is identified by using the relative coordinates when the designated component (reference model) is changed, and when its parent pass point is deleted together with the change of the reference model, the position is identified by using the reference coordinates. This is applied also to a pass point using two types of position references for the position management.

By using a plurality of (plural variety of) position references for the position management, the position of a pass point can be surely identified even when other pass points are deleted and reference models are changed. This eliminates the necessity of a modification of other pass points and the addition of new pass points, facilitating route design operations (editing of pass points). The present embodiment allows users (designing personnel) to arbitrarily change priorities. Thereby, the positions of pass points can be managed by using desirable position references, facilitating route design operations.

The coordinate system used for reference coordinates (hereinafter, called a "target coordinate system") is defined in the target range in which routes are designed, and the entire apparatus is managed on the basis of a different coordinate system (hereinafter, called an "absolute coordinate system").

Figure 2:
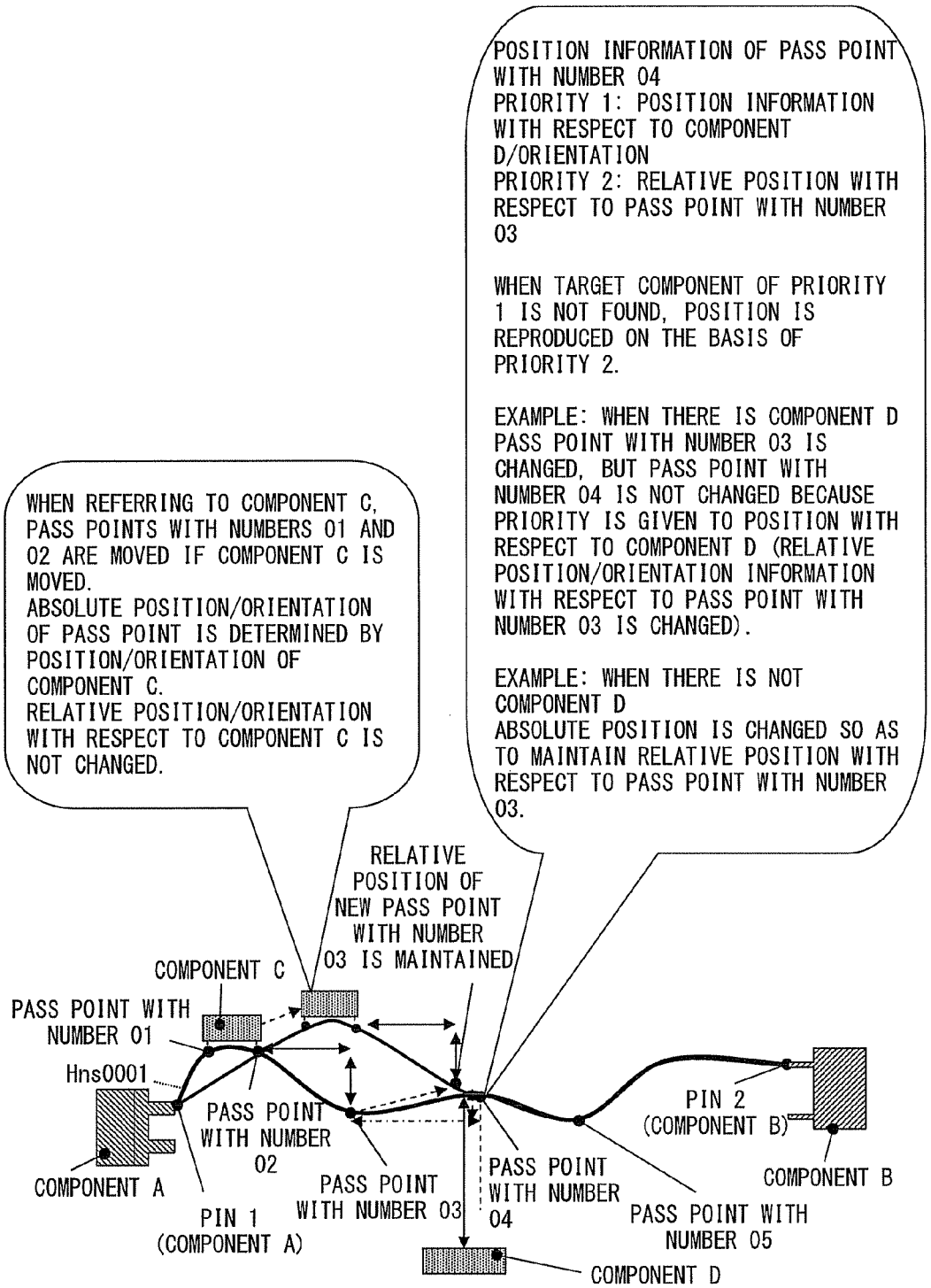
FIG. 2 illustrates position management conducted for a generated pass point.

FIG. 2 illustrates position management conducted for a generated pass point. In FIG. 2, a harness is provided between components A and B, and five pass points with pass point numbers 01 through 05 are generated between components A and B. Three pass points, with pass point numbers 01, 02, and 04, use model references with the highest priority ("priority 1" in FIG. 2; this expression will be used hereinafter). The second highest priority ("priority 2", similarly) is given to the relative coordinates in pass point 04. The highest priority is given to the relative coordinates in the pass point with pass point number 03. In order to facilitate the understanding of relationships between pass point numbers and pass points herein, the pass point numbers are assigned to the pass points in ascending order starting from one of components A and B. "Hns0001" in FIG. 2 is an ID assigned to be used for the identification of harnesses for which routes are designed.

In FIG. 2, the position of component C is moved. The pass points with pass point numbers 01 and 02 refer to component C as a reference model. In response to this movement of the position of component C, the positions of those pass points are automatically changed in association with one another so that the relative positions are maintained. The position change of the pass point with pass point number 02 causes an automatic position change of the pass point with pass point number 03 because the pass point with pass point number 02 is the parent of the pass point with pass point number 03 so that the relational position between them is maintained.

The pass point with pass point number 04 refers to component D as a reference model. Because the position of component D has not been changed, the position of the pass point with pass point number 04 has not been changed. When component D is deleted, the position of the pass point with pass point number 04 is automatically changed in accordance with the position change of the pass point with pass point number 03 because priority 2 is given to relative coordinates.

Figure 3A:
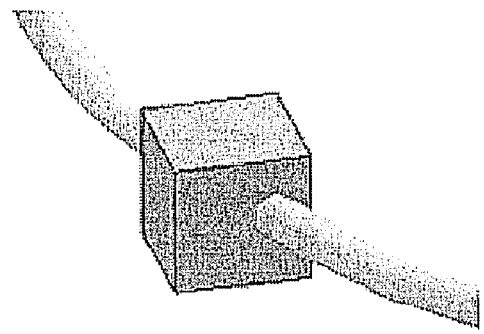
FIG. 3A illustrates a pass point using a reference component (model), i.e., the pass point using a model reference with the highest priority.
Figure 3B:
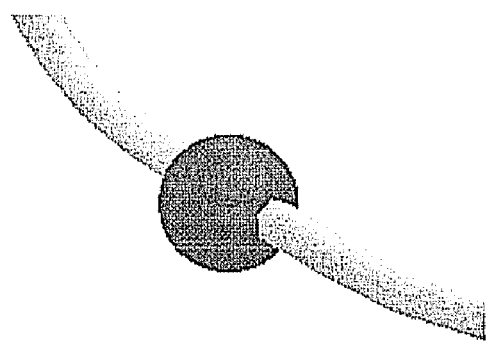
FIG. 3B illustrates a pass point using reference coordinates with the highest priority.
Figure 3C:
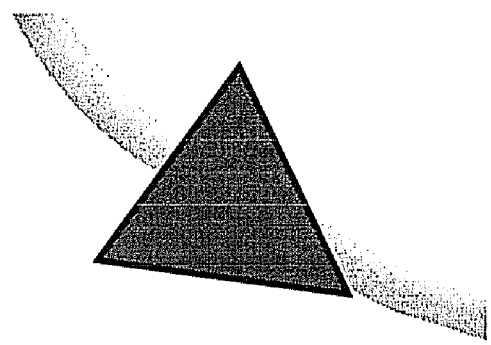
FIG. 3C illustrates a pass point using relative coordinates with the highest priority.

FIGS. 3A through 3C illustrate the display content of pass points on the basis of position references with the highest priority. FIG. 3A illustrates a pass point having a reference component (model), i.e., the pass point using a model reference with the highest priority. FIG. 3B illustrates a pass point using reference coordinates with the highest priority. FIG. 3C illustrates a pass point having relative coordinates with the highest priority.

As illustrated in FIGS. 3A through 3C, in the present embodiment, pass points can be expressed using different figures, i.e., a rectangle, a circle, or a triangle. Thereby, the position reference with the highest priority can easily be found for each pass point. Accordingly, when the position of a pass point is changed, a pass point that is influenced by that change can be identified easily. Facilitated identification of a pass point that will be influenced also facilitates editing of pass points with the consideration of the influence, realizing route design operations at a higher speed and in a more appropriate manner.

FIG. 4 illustrates examples of a display of a route design. This route design consists of the generation of eight pass points 41 through 48. Pass points 41, 46, and 48 use a model reference with priority 1, pass points 42, 43, and 47 use reference coordinates with priority 2, and pass points 44 and 45 use relative coordinates with priority 1. Pass point 41 was generated at a position closest to the starting point, i.e., pass point number 01 is assigned to pass point 41.

Figure 8:
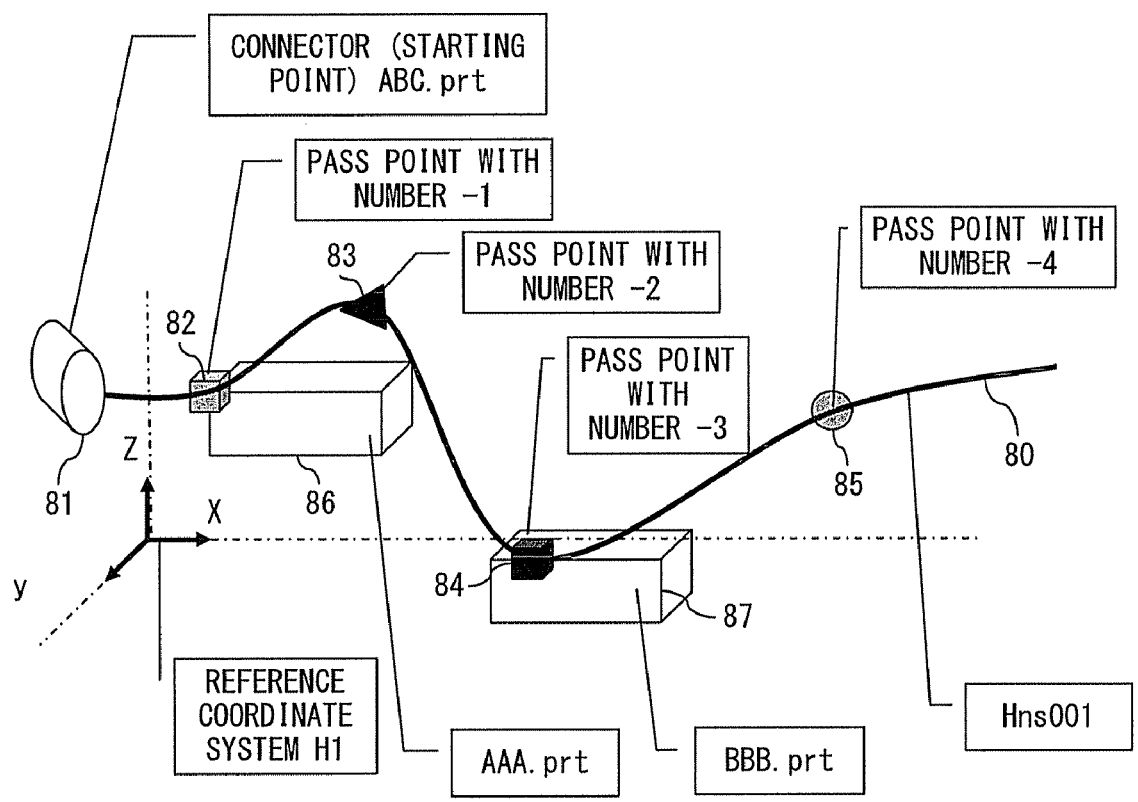
FIG. 8 illustrates an example of displaying another route design.

FIG. 8 illustrates an example of displaying another route design. This route design is for a harness 80 starting from a connector 81 in a component whose reference model (component) name is "ABC.prt". The ID of the harness 80 is "Hns001". In FIG. 8, the position references with priority 1 for the four pass points 82 through 85 are as described below.

Pass point 82 with pass point number −1 refers to a component 86 whose reference model name is "AAA.prt", and priority 1 is given to the model reference. Pass point 83 with pass point number −2 refers to the pass point 82 as a parent, and priority 1 is given to the relative coordinates. Pass point 84 with pass point number −3 refers to a component 87 whose reference model name is "BBB.prt", and priority 1 is given to the model reference. In pass point 85 with pass point number −4, priority 1 is given to the reference coordinates.

FIGS. 5A through 5C and 6A through 6C illustrate display content changing in response to the editing of the route design illustrated in FIG. 4. Next, changes in display content in response to editing will be explained specifically by referring to FIGS. 5A through 5C and 6A through 6C.

Figures 5A, 5B, 5C:
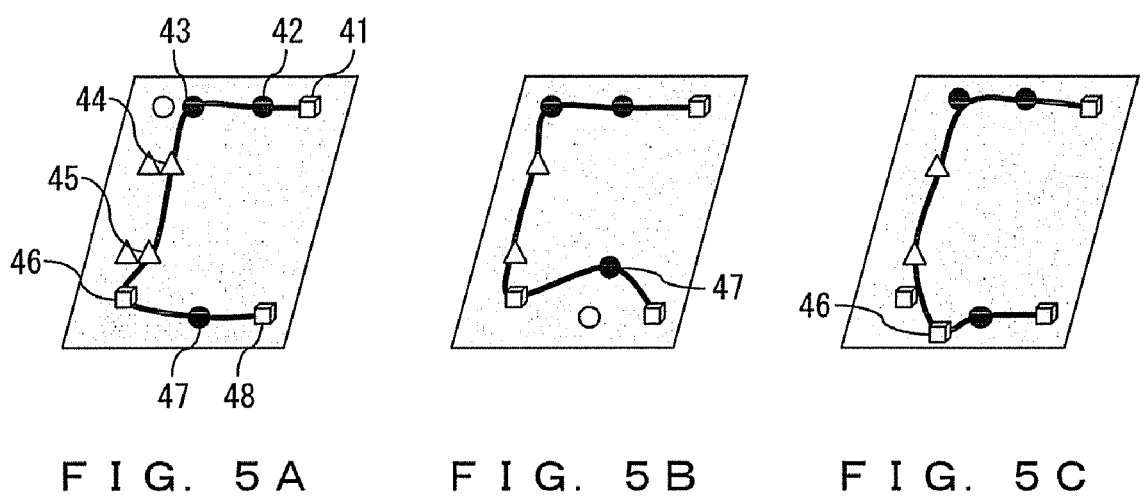
FIG. 5A illustrates a change in display content caused by a position change of the pass point 43 from the route design illustrated in FIG. 4.
FIG. 5B illustrates a change in display content caused by a position change of the pass point 47 from the route design illustrated in FIG. 4.
FIG. 5C illustrates a change in display content caused by a position change of the pass point 46 from the route design illustrated in FIG. 4.

FIGS. 5A through 5C illustrate display content changing in response to the editing of changing positions of pass points. FIG. 5A illustrates a change in the display content caused by a position change of pass point 43. FIG. 5B illustrates a change caused by a position change of pass point 47. FIG. 5C illustrates a change caused by a position change of pass point 46. The position change of pass point 46 can be caused by changes in the relative position with respect to the reference model or of the arrangement (position or orientation) of the reference model.

In FIG. 5A, the position change of pass point 43 has caused position changes of pass points 44 and 45 in an associated manner. Pass point 44 refers to pass point 43 as a parent, and pass point 45 refers to pass point 44 as a parent. In FIGS. 5B and 5C, the positions of only the edited pass points 47 and 46 have been changed. These figures illustrate that which of the pass points will be influenced by a position change of another pass point is easily found because different content is displayed depending upon the position reference having priority 1.

FIGS. 6A through 6C illustrate display content changing in response to the changing of the priorities. FIG. 6A illustrates a change in the display content caused by changing priority 1 in the pass point 45 into absolute coordinates and thereafter changing a position of pass point 43. FIG. 6B illustrates a change in the display content caused by changing priority 1 of pass points 44 and 46. FIG. 6C illustrates a change in the display content caused by changing priority 1 of the pass points 44 and 46. In FIG. 6B, priority 1 in pass points 44 through 47 is changed into absolute coordinates, and priority 1 in pass point 45 is changed into the model reference. As illustrated in FIGS. 6A through 6C, changes in priority 1 can easily be recognized as well.

On each pass point, whether or not to fix the passing direction of a harness passing through the pass point can be designated as an attribute. Pass points are displayed in different colors depending upon the attribute, i.e., whether or not the passing directions are fixed so that users can recognize the differences easily.

Figure 7A:
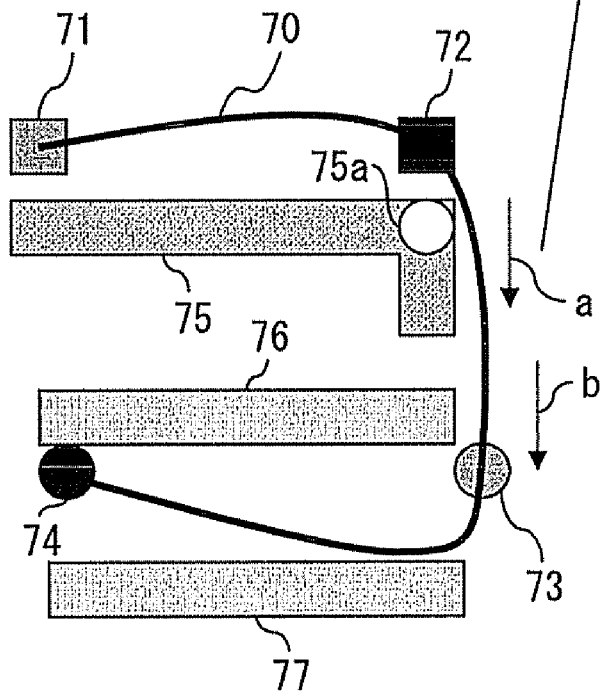
FIG. 7A illustrates a route of a harness before the orientations of parts are changed.
Figure 7B:
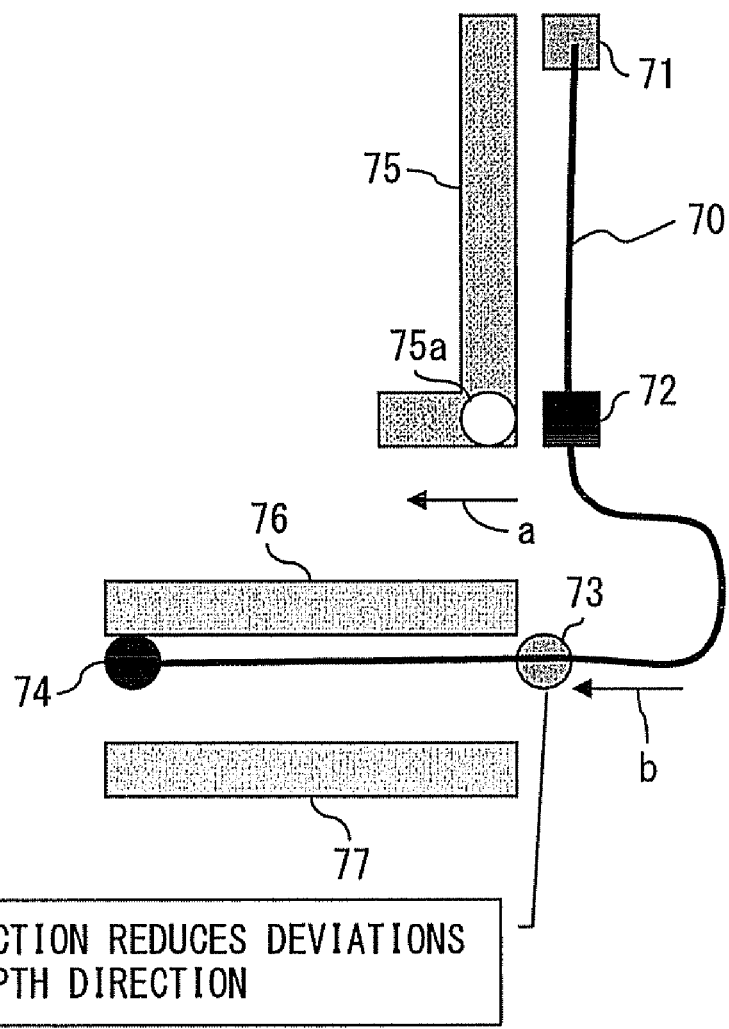
FIG. 7B illustrates a route of a harness after the orientations of parts are changed.

FIGS. 7A and 7B illustrate the route change of a harness that result depending upon whether or not the passing directions in pass points are fixed. In FIGS. 7A and 7B, numeral 70 denotes a harness, numerals 71 through 74 denote pass points, numeral 75 denotes a component serving as a reference model, and numerals 76 and 77 denote components that are not a reference model. Arrow a represents the orientation of the component 75, and arrow b represents the direction of the harness 70. FIGS. 7A and 7B use a route of the harness 70 to illustrate a pass point direction in the case when only the passing direction at the pass point 73 is referred to.

In FIG. 7A, the pass points 71 through 74 are arranged to form a U shape. Thus, the harness 70 greatly curves at the pass point 73. In FIG. 7B, the component 75 has been swung on an axis 75a, and the passing direction denoted by arrow b has also been changed so that it is parallel to the component 75 because the passing direction of pass point 73 corresponds to the direction of the component 75. Thereby, it is not necessary to greatly curve the harness 70 at the pass point 74 to make the route between pass points 72 and 74 appropriate.

A route that is fixed without referring to a model for the passing direction is maintained similarly to the route between pass points 73 and 74 illustrated in FIG. 7B even when the component 75 is changed in its orientation, as illustrated in FIG. 7A. As is obvious from this, an appropriate selection of a pass point at which the passing direction is fixed makes it possible to maintain the shape of a route in a section in which the shape of a route must not be changed. Whether or not to fix the passing direction can be set for each pass point, and thus the above section can be arbitrarily selected. Accordingly, great convenience is achieved, facilitating a route design operation.

In the present embodiment, the passing direction is fixed by selecting a position reference for the direction. Thereby, the passing direction can be selected at a desired position reference so that easy and appropriate designation of a pass point is realized. This means, in the example of FIGS. 7A and 7B, that it is possible to designate a passing direction at the pass point 73 by referring to, for example, one of the components through 77, or by referring to another pass point such as pass point 72. Herein, in order to avoid confusion, the position reference is called "Passing direction reference coordinates".

Figure 9:
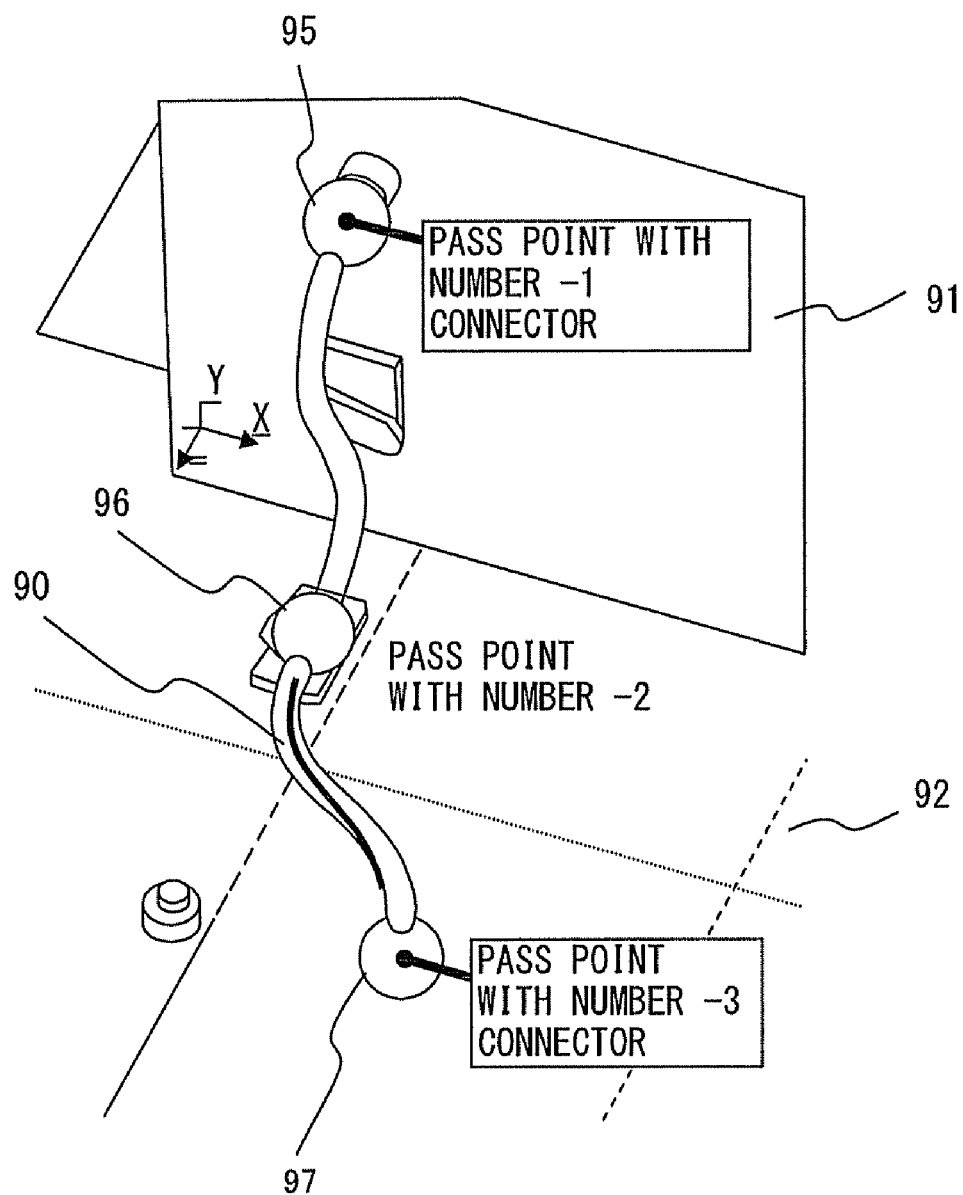
FIG. 9 illustrates a result of a route design (first)
Figure 10:
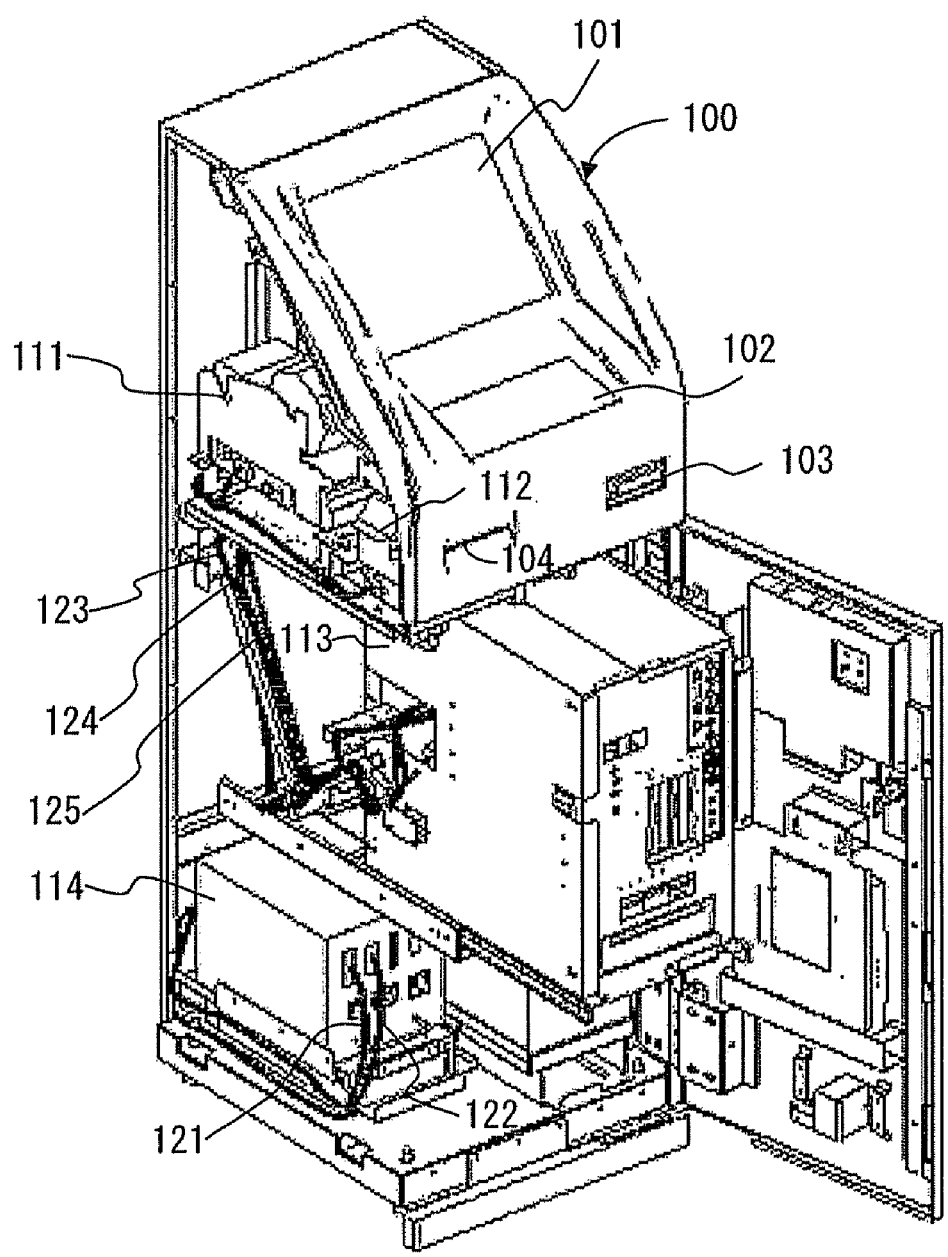
FIG. 10 illustrates a result of a route design (second)

FIGS. 9 and 10 illustrate a result of a route design operation. FIG. 9 illustrates a harness 90 provided between components 91 and 92. This route is designed by generating three pass points 95 through 97. FIG. 10 illustrates an apparatus 100 to which the harness is actually provided. The apparatus 100 is a cash dispenser (CD) used in convenience stores or the like. In FIG. 10, numeral 101 denotes a display device, numeral 102 denotes an operation input unit, numeral 103 denotes a card insertion slot, numeral 104 denotes a cash outlet, numeral 111 denotes an upper unit, numeral 112 denotes a cash drain unit, numeral 113 denotes a controller, numeral 114 denotes a power unit, and numerals 121 through 125 denote harnesses. The two harnesses 121 and 122 connected to the power unit 114 are connected to the controller 113 and the upper unit 111, respectively. The controller 113 is connected to the upper unit 111 via the three harnesses 123 through 125.

Next, the operations of the respective units 21 through 24 for implementing the support of a route design operation will be explained in detail referring to FIG. 1 again.

The harness management unit 21 analyzes operations input into the input device 1, recognizes instructions from the user, and executes processes in accordance with the instructions. The executed processes implement a route design operation, and data of pass points generated as a result of the design operation is generated and stored by the pass point management unit 23.

The pass point management unit 23 generates a pass point position table illustrated in FIG. 12 for each of the harnesses that are the targets of a route design operation in accordance with editing operations by a user. The pass point position tables are updated as necessary. A harness table illustrated in FIG. 13 used for managing the pass point position table is generated and updated by, for example, a harness management unit 21. The pass point position table illustrated in FIG. 12 is generated from the route design operation illustrated in FIG. 8.

Data in the pass point position table is stored for each of the pass points managed by using pass point numbers. The data stored in this table includes relative position coordinates (A), relative position (X1, Y1, Z1, RXa, RXa, RXa), reference position coordinates (B), reference position (X2, Y2, Z2, RXb, RXb, RXb), reference model name (C), reference model relative position, priorities 1 through 3, whether or not a passing direction is fixed, passing direction reference coordinates, and passing directions RX through RZ.

The data "relative position coordinates (A)" indicates a pass point (parent) serving as a reference destination when priority 1 is given to relative coordinates. "H1" stored as data of a pass point with pass point number 1 (starting point) is for a target coordinate system to which reference coordinates are applied. This is because a pass point serving as the starting point does not have a parent pass point.

The data "relative position" indicates a relative position with respect to the parent pass point. "X1, Y1, Z1" represent position differences on the respective axes, and "RXa, RXa, RXa" represent the orientation differences on the respective axes. The data "reference position coordinates" indicates a target coordinate system to which the reference coordinates are applied. The data "reference position" indicates a position/orientation of the origin of the target coordinate system. "X2, Y2, Z2" represent positions with respect to the origin on the respective axes. "RXb, RXb, RXb" represent orientations (angles) with respect to the origin on the respective axes. The reference model name corresponds to the ID of a component referred to. The data "reference model relative position" indicates a relative position with respect to a reference model. The relative position is expressed in the form of differences on the respective axes. Priorities 1 through 3 are used to manage priorities among reference coordinates, relative coordinates, and a model reference. "A" through "C" expressing stored data represent relative coordinates, reference coordinates, and a model reference, respectively. "Whether or not to fix a passing direction" illustrates whether or not a passing direction is fixed. "ON" means that the direction is fixed. "OFF" means that the direction is not fixed. The data "passing direction reference coordinates" indicates a position reference set for the designated passing direction. "Passing directions RX through RZ" represent the designated passing directions.

The priority management unit 23*a* stores and updates data of priorities 1 through 3. The individual pass-point position managing unit 23*b* stores and updates data of relative position coordinates, relative positions, reference position coordinates, reference positions, reference model names, and reference model relative positions. The passing direction management unit 23*c* stores and updates information of whether or not to fix passing directions. The coordinate management unit 23*d* stores and updates data of passing direction reference coordinates and passing directions RX through RZ. These storing and updating operations are based on user's instructions recognized by the harness management unit 21. Thereby, a route design operation is supported through the editing of pass points.

The passing direction management unit 23*c* extracts data of priority 1 and whether or not to fix the pass point for each pass point, and transmits the data to the pass point display unit 24*a* in the display unit 24. The pass point display unit 24*a* refers to the display table illustrated in FIG. 14 in accordance with the transmitted data, determines the display content (i.e., the shape and the color), and causes the output device 3 to display the information in the determined color and shape. The display position is determined by referring to, for example, data of the reference position. Thereby, pass points are displayed as exemplified in FIGS. 4 through 6C or FIG. 8. In FIG. 14, the expression "having reference model" means that priority 1 is given to a model reference, and the expression "having reference model" means that priority 1 is given to reference coordinates, and the expression "relative position" means that priority is given to relative coordinates. The expression "passing direction is fixed" means that a pass point is fixed, and the expression "pass point not fixed" means that a pass point is not fixed. The expressions "Display 001" through "Display 006" represent IDs of image data used for displaying pass points whose attributes are identified by, for example, two pieces of attribute data.

The harness table illustrated in FIG. 13 stores, for each harness (or for an ID assigned to each harness), an offset of the target coordinate system (the position difference of the origins between the absolute coordinate system and the target coordinate system, which is called "harness reference coordinate origin from absolute coordinate system" in FIG. 13), the number of the drawing depicting the route design, the name of the harness, the name of the model to which the starting-point connector is provided, the pass point number, and the name of the model to which the ending-point connector is provided. The pass point numbers are assigned starting from the starting-point connector, and therefore are serial.

The route generation unit 25 refers to the pass point position table, and thereby generates the route of the harness designed by a user while considering the harness identified on the basis of the shape of the cross section of the harness in order to transmit the generation result to the display unit 24. Thereby, the harness provided along the route is displayed as the design result on the output device 3. The generation of the route can be performed by, for example, the technique disclosed by Patent Document 1.

Next, the operations of the above generation system 2 will be explained by referring to the flowcharts illustrated in FIGS. 15 through 19. For simplicity, the processes will be explained for each of the various cases, namely, a case in which a harness is to be generated newly, a case in which a pass point is to be added to respond to an extended harness, a case in which a pass point is to be added arbitrarily, a case in which a pass point is to be deleted, and a case in which a pass point is to be moved. The series of processes will be explained in a simplified manner. All of these processes are implemented by the CPU 61 (illustrated in FIG. 11) loading design support software stored in the external storage device 65 into the memory device 62 and executing them.

Figure 15:
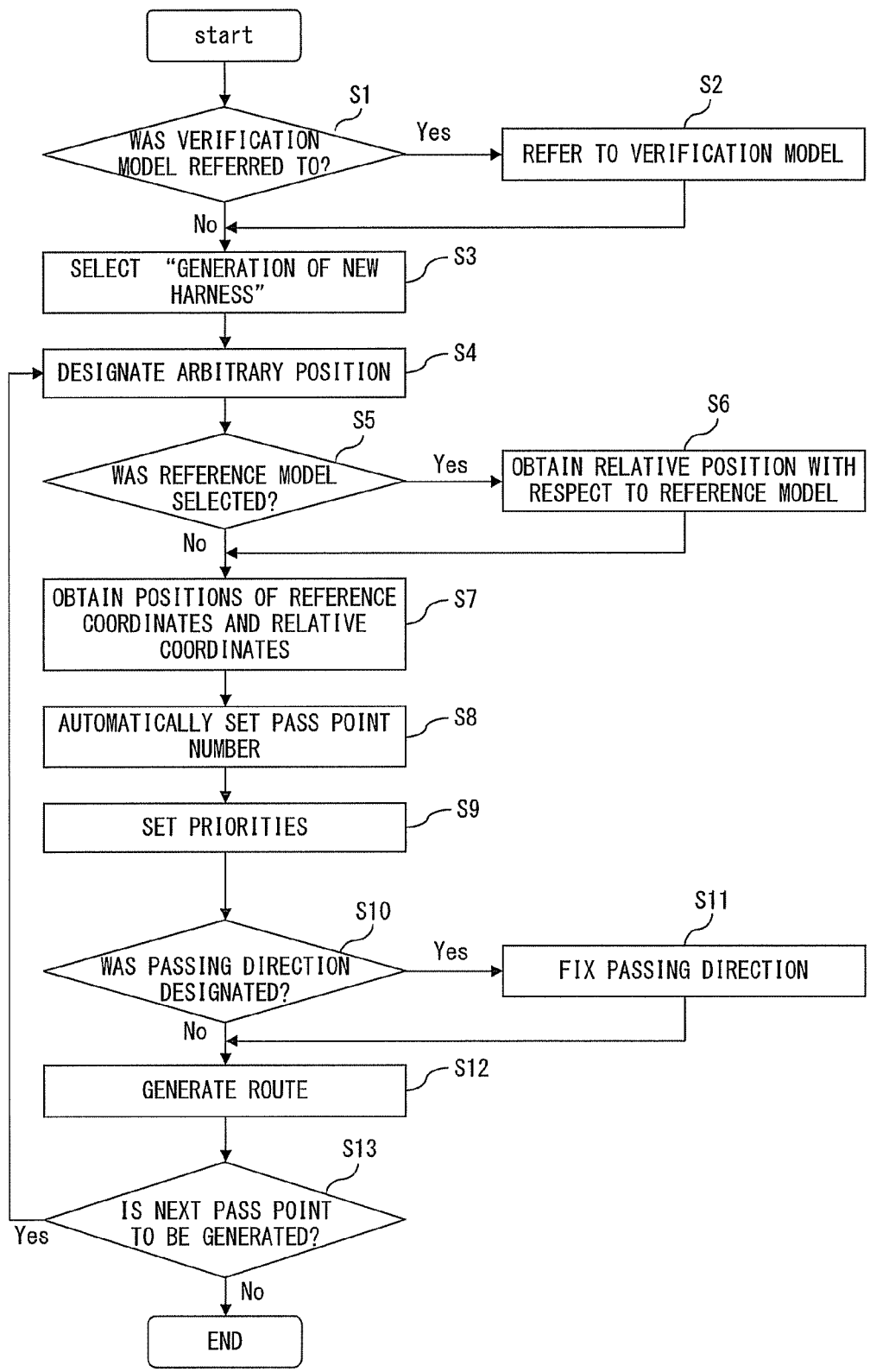
FIG. 15 illustrates a flowchart for a new-harness generation process.

FIG. 15 illustrates in detail a flowchart for anew-harness generation process executed when a new harness is to be generated.

When being activated, the above design support software displays an initial menu window, and prompts the user to select a desired function in the window. Route design operations must be able to be performed independently for different apparatuses. Accordingly, when a route is designed for a new harness, an apparatus that is the target of the route design has to be selected by the user. An apparatus does not always have to be selected. The selection of an apparatus corresponds to the selection of model data as the target to be read from the DB 22*a* by the three-dimensional model management unit 22.

Figure 23:
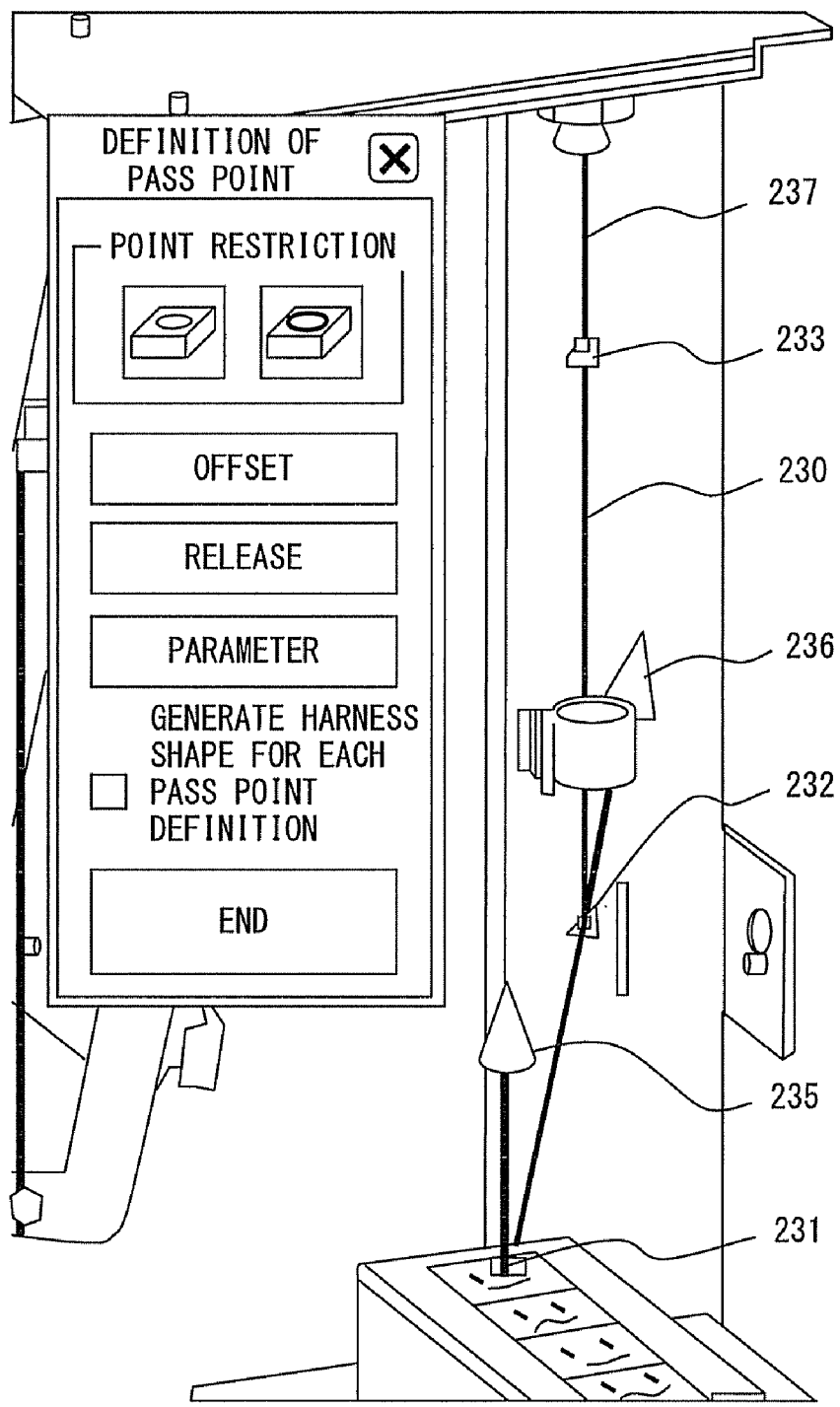
FIG. 23 illustrates another pass-point generation menu window.

For the above reasons, it is determined, in step S1, whether or not an apparatus as the route design target has been selected. When an apparatus has been selected, the determination result is Yes and the process proceeds to step S2, in which the model data of the selected apparatus is accessed. Thereafter, the process proceeds to step S3. When an apparatus is not selected, the determination result is No, and the process proceeds to step S3. By accessing the model data, the apparatus is displayed (FIG. 23). The explanations given hereinafter are based on the assumption that the target of the route design is the displayed portion. The drawing number of the displayed portion is stored in the harness table (FIG. 13).

Figure 21:
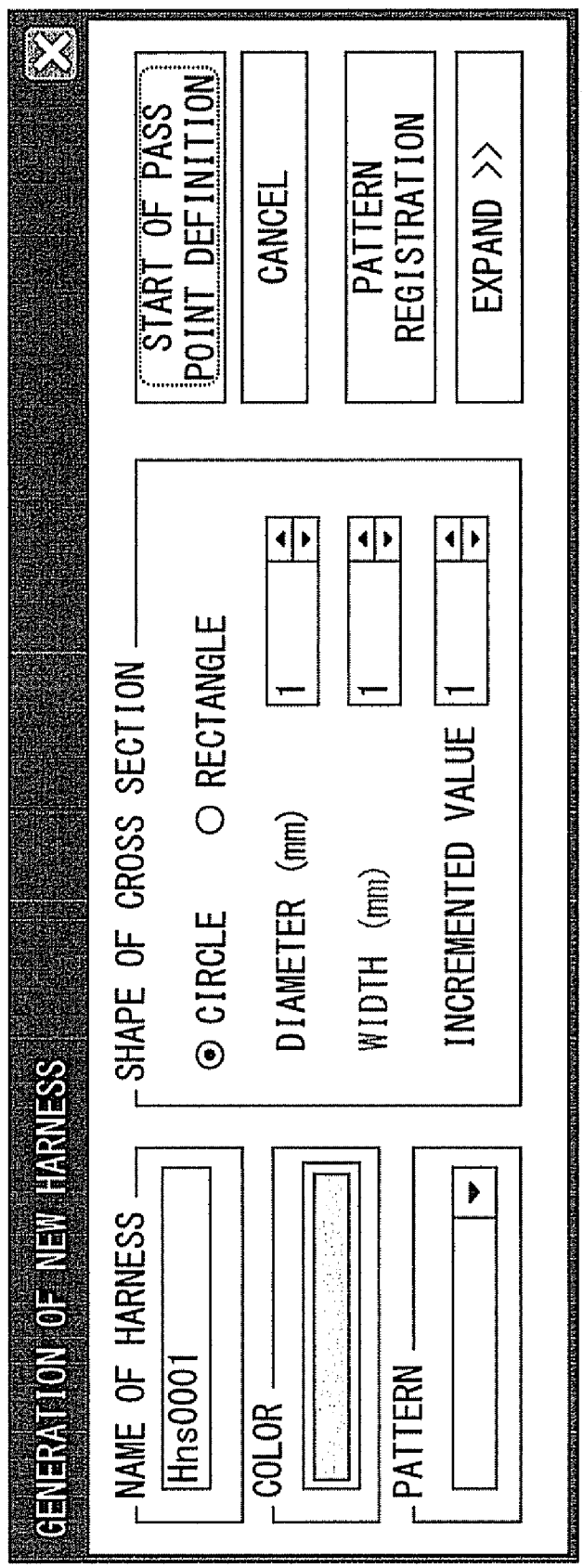
FIG. 21 illustrates a new-harness generation menu window.

In step S3, an edit menu window (not illustrated) is displayed in order to prompt the user to select a form of editing. Examples of the form of editing are an update (editing of an existing route design), generation of a new harness, and the like. When the user has selected "generation of new harness", a new-harness-generation menu window illustrated in FIG. 21 is displayed, and the user is prompted to input data of the harness whose route is to be newly designed. The ID of the harness and the shape of the cross section are input as the data. The route design starts when the "pass point definition start" button is pushed. When this button is clicked, the process proceeds to step S4. "Hns0001" represents the input ID.

Figure 22:
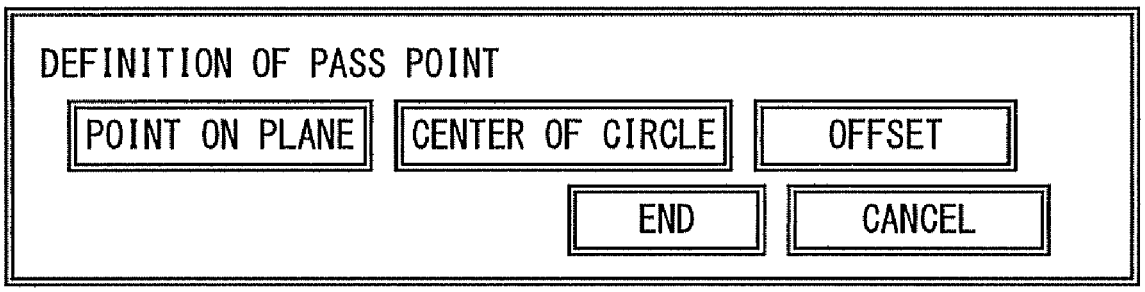
FIG. 22 illustrates a pass-point generation menu window.

The generation of a pass point consists of selecting a position reference to which priority 1 is to be given by moving the mouse cursor. In step S4, the pass point-generation menu window illustrated in FIG. 22 is displayed, the mouse cursor is moved in response to the input of the user, and the menu waits for the user to click the position. When the user has clicked the position, the process proceeds to step S5.

The pass-point generation menu window illustrated in FIG. 22 is used to prompt the user to select the position reference to which priority 1 is to be given, and has three buttons, i.e., a "point on plane" button, a "center of circle" button, and an "offset" button. When either the "point on plane" button or the "center of circle" button is clicked, a model reference is set. When the "offset" button is clicked, relative coordinates are set. When the "point on plane" button is clicked, the passing direction of the harness is fixed biaxially (fixed to be on the plane on which the reference model is designated). When the "center of circle" button is clicked, the passing direction is fixed triaxially (a point whose position was designated serves as an axis). The reference model is a component existing at the clicked position. The "end" button is used to terminate the route design operation. The "cancel" button is used to invalidate the route design result.

In step S5, the system waits until one of the buttons ("point on plane", "center of circle", or "offset") is clicked, and when one of them is clicked, it is determined whether or not the clicked button is the button "point on plane" or "center of circle". When the clicked button is one of the two buttons, i.e., when the user has selected a model reference, the determination result is Yes, and the relative position from the reference model selected arbitrarily is obtained in step S6, and thereafter the process proceeds to step S7. When neither of these buttons has been clicked, i.e., the user has clicked the "offset" button, the determination result is No, and the process proceeds to step S7. The relative position with respect to the reference model is obtained by for example calculating the difference between the reference model and the designated position.

The pass point to be generated first does not have a parent pass point. Accordingly, when there is not a pass point that has already been generated, the "offset" button is displayed in an unselectable state (this is not illustrated any of the drawings).

In step S7, a reference position and a relative position are obtained in order to perform the position management respectively by using reference coordinates and relative coordinates. For example, a reference position is obtained by calculating the coordinates of the designated position on the target coordinate system, and a relative position is obtained by calculating a difference with respect to the parent pass point for each of the coordinate axes. For the first pass point, the reference position is obtained as a relative position (FIG. 12). In step S8, pass point numbers to be assigned to the pass points whose positions have been obtained are automatically set. This automatic setting is performed so that the numbers are ordered in ascending order starting from the first pass point. Thereafter, the process proceeds to step S9.

The processes in steps S4 and S5 correspond to the processes implemented by the harness management unit 21. The processes in steps S6 through S8 correspond to the processes implemented by the individual pass-point position managing unit 23b of the pass point management unit 23. The object of obtaining data of all the available positions is to surely identify the positions of pass points even when the component designated as the reference model is exchanged. The situation in which necessary positions cannot be obtained due to an error occurring while deleting a pass point is also avoided surely. Thereby, data is stored highly securely.

In step S9, priorities are automatically set. When the "point on plane" button or "center of circle" button has been clicked, the priority order starting from the highest priority is model reference, relative coordinates, and reference coordinates. When the "offset" button has been clicked, the order is relative coordinates and reference coordinates. The priority order that has been automatically set can be modified by referring to the corresponding property of a pass point. The process in step S9 corresponds to the process implemented by the priority management unit 23a of the pass point management unit 23. After step S9, the process proceeds to step S10.

In step S10, it is determined whether or not the passing direction of the harness has been designated. When the "point on plane" button or "center of circle" button has been clicked, the determination result is Yes, and the fixation of the pass point is set in accordance with the type of the clicked button. In step S11, the passing direction is designated on a designation menu for designating passing directions. Thereafter, the process proceeds to step S12. When the "offset" button has been clicked, the determination result is No, and the process proceeds to step S12. The process in step S10 corresponds to the process implemented by the passing direction management unit 23c and the coordinate management unit 23d of the pass point management unit 23.

As described above, passing directions can be fixed in two ways. Accordingly, two types of data are prepared for representing the fixation of pass points. Thereby, it is possible to determine whether or not a passing direction is fixed and to determine the manner of the fixation if a pass point is fixed. The designation menu window is for prompting the user to designate, for example, an angle between a fixation axis and the passing direction, although this is not illustrated in a drawing.

In step S12, routes of all the harnesses that pass through the generated pass points are generated, and the result is displayed. Also, newly generated pass points are displayed in accordance with their attributes. Thereafter, the process proceeds to step S13, and it is determined whether or not the user is going to generate a next pass point. This determination is made, for example, on the basis of whether or not a new position has been designated. When the user has designated a new position, the determination result is Yes, and the process returns to step S4 in order to execute processes in response to that new position designation. When it is determined that the position designation was not made and the "end" or "cancel"

button was clicked, the determination result is No, and the pass point position table is stored as necessary (FIG. 12) and a series of the processing is terminated. Specifically, with the "end" button being clicked, the pass point position table is stored, and with the "cancel" button being clicked, the table is deleted.

FIG. 23 illustrates another pass point generation menu window.

This pass point generation menu window has a frame with the title "point restriction" and includes two buttons. One of the two buttons corresponds to the "point on plane" button, and the other button corresponds to the "center of circle" button. In FIG. 23, numerals 231 through 233 denote pass points generated in the route design for a harness 230. Arrows 235 through 237 extending from pass points 231 through 233 represent the directions of the harnesses passing through pass points 231 through 233. The pass point generation menu window can employ the same configuration as that illustrated in FIG. 23, and also can employ a different configuration. In other words, the configuration of the window is not particularly limited, and this is applied to other windows.

As described above, the present embodiment automatically sets priorities, and the set priorities can be changed by referring to the properties of pass points. Whether or not to fix passing directions (including the manner of the fixation) and the position of pass points are attributes that can be modified. Herein below, the manner of modifying the attributes will be explained specifically by referring to FIGS. 24 through 26.

When referring to the above property, a property window (not illustrated) is displayed. The property window is used to confirm the setting content of attributes and modification of the set content. The property window has buttons for selecting the content for each type of the attributes. For simplicity herein, a button for selecting a priority is called a "priority" button, and a button for selecting whether or not to fix passing directions is called a "passing direction" button. The menu windows illustrated in FIGS. 24 through 26 are windows displayed in response to the clicking of one of the above buttons. In addition to the above buttons, there is a "pass point position" button for selecting a position of a pass point and a "passing direction fixation" button for selecting the fixed passing direction.

First, a manner of modifying a priority will be explained.

When a user clicks the "priority" button in the priority window, the priority menu window illustrated in FIG. 24 or 25 is displayed in accordance with the set priority. FIG. 24 illustrates a case in which a priority including the model reference is set. FIG. 25 illustrates a case in which the priority of a model reference is not set.

In FIGS. 24 and 25, the expressions "not influenced by others (position with respect to reference)", "influenced by previous pass point (relative position)", and "influenced by reference component" respectively represent reference coordinates, relative coordinates, and a model reference. Priorities are changed by changing values in the input boxes disposed before those expressions. The values "1" through "3" in the input boxes represent the priorities. The position reference before which option buttons are disposed in place of the input boxes are invalidated. The model reference that is invalidated in FIG. 24 is validated by clicking an option button and inputting a reference model name in a reference model (component) name input box. The "select" button is for selecting a reference model name from among components. When a model reference is validated and the priority menu window is closed, input reference model name and the relative position with respect to the reference model are newly stored in the pass point position table data of a pass point whose priority has been changed, and the priorities are updated.

Next, a manner of changing the setting of whether or not to fix passing directions will be explained.

When a user clicks the "passing direction" button on the property window, the passing direction menu window illustrated in FIG. 26 is displayed. On the menu window are the expressions "not fixed (no fixation axis)", "fixed (three-axes fixation)", and "fixed on plane (two-axes fixation)", and option buttons are disposed before these expressions. Whether or not to fix pass points and a manner of the fixation is selected by changing option buttons that express the marks (in FIG. 14, black circles are used to express the marks). When a passing direction is to be fixed newly, the reference model name is to be input in a similar manner to the priority.

Also, when the "pass point position" button and the "passing direction fixation" button are clicked, a window concerning which positions of pass points can be changed (not illustrated) and a window concerning which fixed passing direction can be modified (not illustrated) are displayed. Thereby, users can arbitrarily modify the positions of pass points and passing directions.

Figure 16:
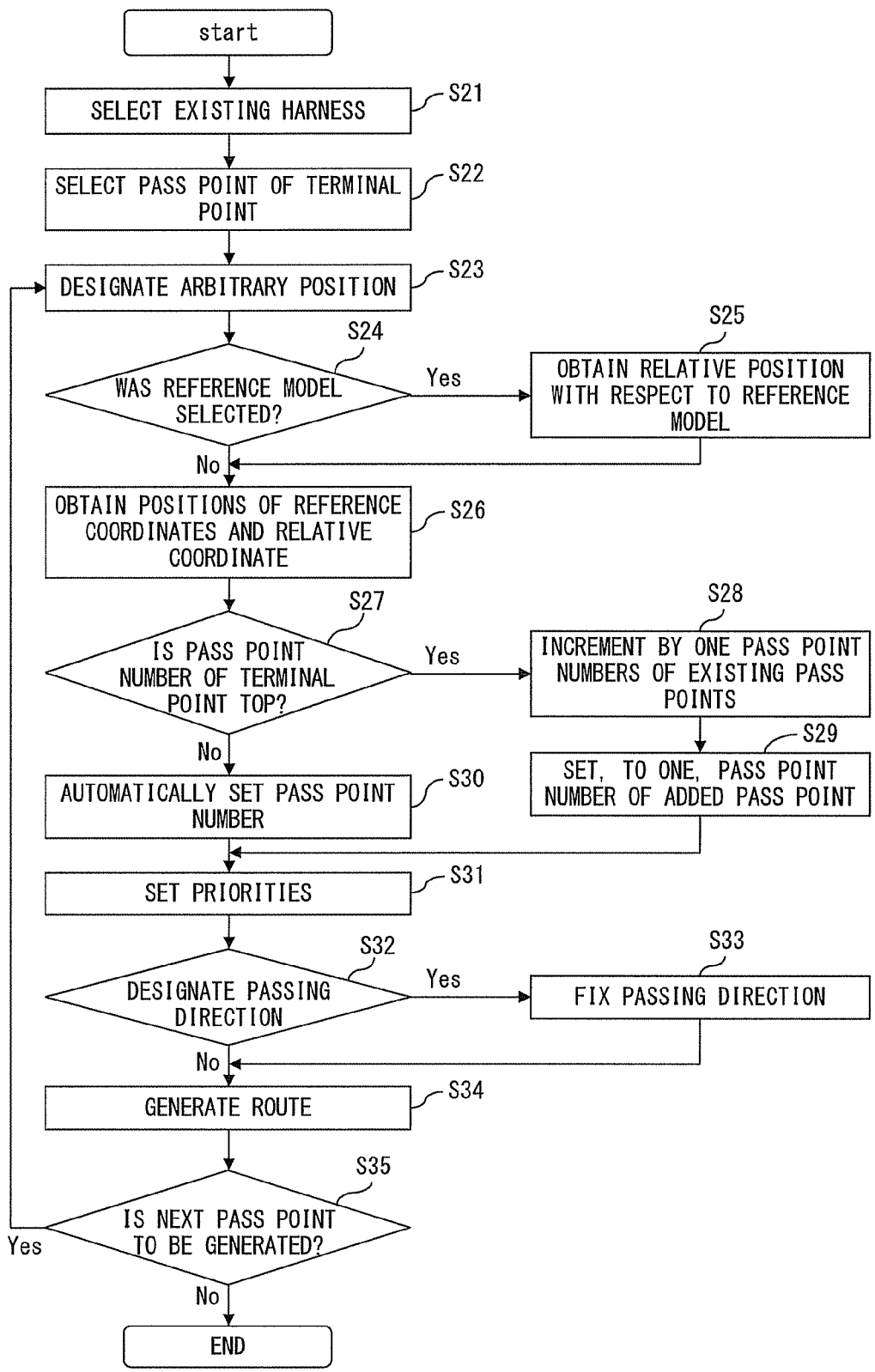
FIG. 16 illustrates a flowchart for a harness-extension generation process.

FIG. 16 illustrates a flowchart for a harness-extension generation process executed when a pass point is to be added in order to extend a harness. Next, this process will be explained in detail by referring to FIG. 16.

This editing is performed on an existing route design. Accordingly, the user selects the "update" button in the edit menu window. Herein, only the processes executed after the "update" button is selected will be explained for the simplicity.

First, in step S21, the harness selection window illustrated in FIG. 20 is displayed in accordance with the selection of the "update" button. The selection window is used to select which harness is to be edited from among the harnesses whose route design results are stored, and displays a list of the harnesses. A harness is selected by clicking the "OK" button after selecting one of the harnesses on the list. Thereafter, the process proceeds to step S22.

In step S22, the route design result of the harness selected by the user is read from, for example, the external storage device 65, and is displayed. The pass point located at the end is displayed in a selected manner. This is for the purpose of facilitating the selection of the relative coordinates of the pass point located at the end. The pass point generation menu illustrated in FIG. 22 is displayed together. In step S23, the mouse cursor is moved in accordance with the operation of the input device by the user, and the system waits for the user to perform a clicking operation to designate a position. When this clicking operation is performed, the process proceeds to step S24.

In step S24, the system waits until one of the buttons ("point onplane", "center of circle", and "offset") is clicked, and determines whether or not the clicked button is either the "point on plane" button or the "center of circle" button. When one of these two buttons is clicked, i.e., when the user selects a model reference, the determination result is Yes, and the relative position with respect to the reference model designated in the position selection is obtained in step S25. Thereafter, the process proceeds to step S26. When none of the two buttons is clicked, i.e., when the "offset" button is clicked, the determination result is No, and the process proceeds to step S26.

In step S26, a reference position and a relative position are obtained for managing positions on the basis of reference coordinates and relative coordinates respectively. In step S27, it is determined whether or not the pass point whose position was designated is the top. When the user has selected a position that is closer to the starting point than the pass point that was closest to the starting point (this situation corresponds to a case in which a route is designated from the ending point toward the starting point), the determination result is Yes, and the pass point numbers of the existing pass points are incremented by one in step S28. In step S29, the number of the pass point whose position was designated is set to one. Thereafter, the process proceeds to step S31. When the above condition is not satisfied, the determination result is No, and the pass point numbers that have already been assigned to pass points are automatically set in step S30. Thereafter, the process proceeds to step S31.

The processes executed in steps S31 through S35 are fundamentally the same as those in steps S9 through S13 illustrated in FIG. 15. Thus, the explanation thereof will be omitted. When the determination result in step S35 is Yes, the process returns to step S23.

FIG. 17 illustrates a flowchart for an addition process executed when a pass point is to be arbitrarily added. This addition process will be explained in detail by referring to FIG. 17. In this explanation too, the processes executed after the "update" button is selected in the edit menu window will be explained in detail. The addition of a pass point consists of prompting the user to select two adjacent pass points and to designate the position at which the pass point is to be added.

First, in step S41, the harness selection window illustrated in FIG. 20 is displayed, and the user is prompted to select a desired harness. In step S42, the system waits for the user to select the first pass point by clicking, etc. In step S43, the system waits for the user to select the second pass point. Thereafter, the process proceeds to step S44, and the pass point menu window illustrated in FIG. 22 is displayed. Then, the system waits for the user to click a position while moving the mouse cursor in accordance with the operation of the input device by the user. After the user has clicked the position, the process proceeds to step S45.

In step S45, the system waits until one of the buttons ("point on plane", "Center of circle" or "Offset") is clicked, and determines whether or not the clicked button is either the "point on plane" button or the "center of circle" button. When one of these two buttons is clicked, i.e., when the user selects a model reference, the determination result is Yes, and the relative position with respect to the reference model designated in the position selection is obtained in step S46. Thereafter, the process proceeds to step S47. When none of the two buttons is clicked, i.e., when the "offset" button is clicked, the determination result is No, and the process proceeds to step S47.

In step S47, a reference position and a relative position are obtained for managing positions on the basis of reference coordinates and relative coordinates respectively. In step S48, the relative positions of pass points referring to the newly added pass point as a parent are modified. In step S49, the pass point numbers of the pass points that are greater than the greater of the two numbers of the two pass points selected respectively in steps S42 and S43 are incremented by one. In step S50, the greater of the two pass point numbers between the two pass points is set as the number of the newly added pass point. Thereafter, the process proceeds to step S51.

The processes executed in steps S51 through S54 are fundamentally the same as those in steps S9 through S12 illustrated in FIG. 15. Thus, the explanation thereof will be omitted. After step S54, the process proceeds to step S55.

In step S55, it is determined whether or not the user is going to add a next pass point. This determination is made, for example, on the basis of whether or not a new pass point has been selected. When the user has selected a new pass point, the determination result is Yes, and the process returns to step S42, and processes are executed in response to the selection. When the user has given an instruction to terminate the editing without selecting anything, the determination result is No, and a series of the processes are terminated after storing the pass point position table (FIG. 12) as necessary. When the user has given an instruction to store the editing result, the pass point position table is updated and stored. When the user has not given an instruction to store the editing result, the pass point position table is deleted.

Figure 18:
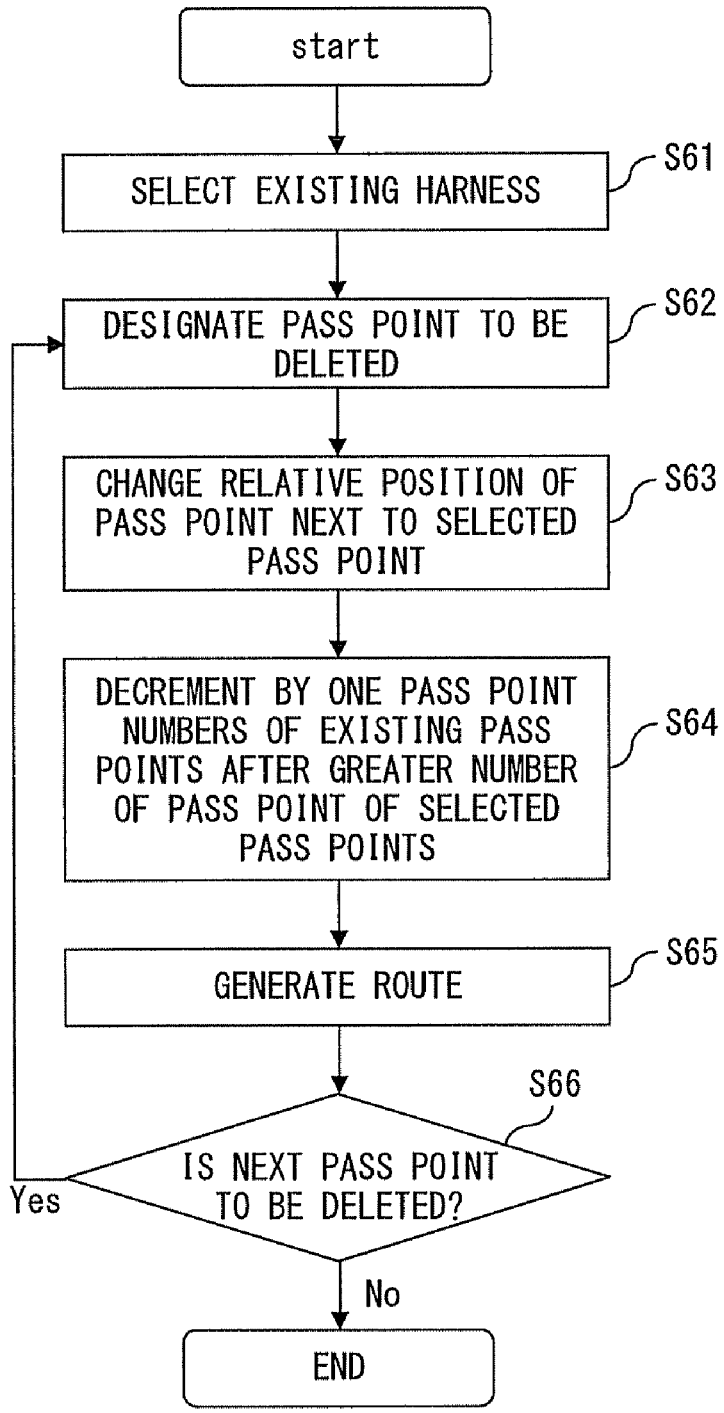
FIG. 18 illustrates a flowchart for a deletion process of a pass point.

FIG. 18 illustrates a flowchart for a deletion process of an added pass point executed when a pass point is to be deleted. This deletion process will be explained by referring to FIG. 18. Similarly to the above explanation, the processes executed after the "update" button is selected in the edit menu window will be explained in detail.

First, in step S61, the harness selection window illustrated in FIG. 20 is displayed in response to the selection of the "update" button in order to prompt the user to select a desired harness. In step S62, the system waits for the user to select the target of deletion by, for example, clicking on it. Next, the process proceeds to step S63.

In step S63, the relative positions of the pass points having assigned pass point numbers that are greater by one than the pass point number of the selected pass point are changed (updated). In step S64, the pass point numbers of pass points having assigned pass point numbers greater than the number of the selected pass point is decremented (updated) by one. Thereafter, the process proceeds to step S65.

In step S65, a new route is generated considering this deletion, and the generation result is displayed. In step S67, it is determined whether or not the user is going to delete a next pass point. This determination is made, for example, on the basis of whether or not a new pass point has been selected. When the user has selected a new pass point, the determination result is Yes, and the process returns to step S62 in order to execute the processes in response to the selection. When the user has given an instruction to terminate the editing without selecting anything, the determination result is No, and a series of the processes are terminated after storing the pass point position table (FIG. 12) as necessary. When the user has given an instruction to store the editing result, the pass point position table is updated and stored. When the user has not given an instruction to store the editing result, the pass point position table is deleted.

Figure 19:
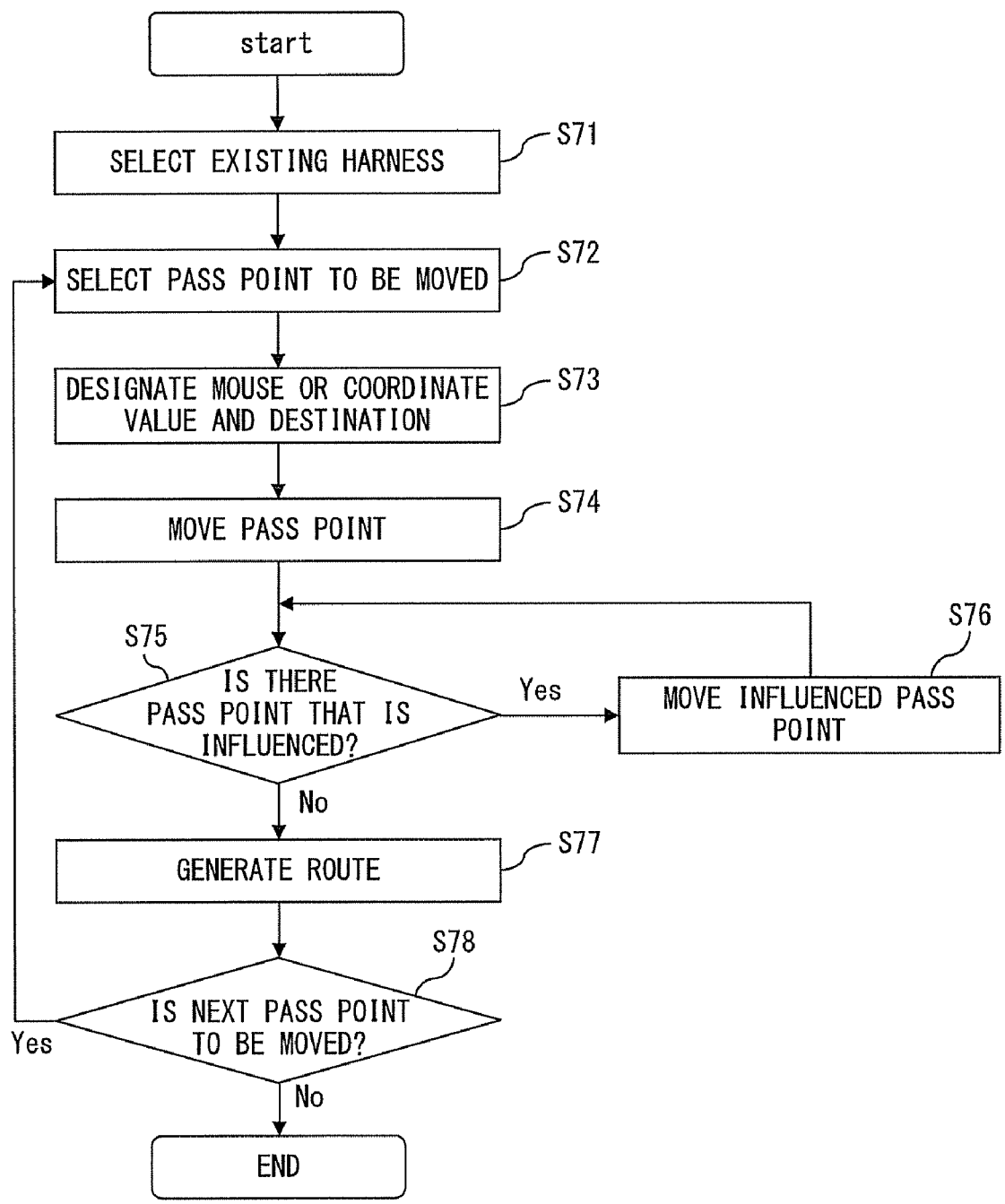
FIG. 19 illustrates a flowchart for a moving process of a pass point.

FIG. 19 illustrates a flowchart for a moving process of an added pass point executed when a pass point is to be moved. This moving process will be explained by referring to FIG. 19. Similarly to the above explanations, the processes executed after the "update" button is selected in the edit menu window will be explained in detail. The moving of a pass point consists of the designation of the position as the moving destination performed after the selection of the pass point to be moved.

First, in step S71, the harness selection window illustrated in FIG. 20 is displayed in response to the selection of the "update" button in order to prompt the user to select a desired harness. In step S72, the system waits for the user to select the target of deletion by clicking on it, etc. Next, the process proceeds to step S73.

In step S73, the system waits for the user to designate the position as the moving destination. In step S74, the pass point is moved to the designated position. In step S75, it is determined whether or not there is a pass point that will be influenced by the moving of the pass point. A pass point referring to the moved pass point as a parent and using the relative coordinates with priority 1 will be influenced. Accordingly, when there is such a pass point, the determination result is Yes, and the process returns to step S75 after moving the pass point that will be influenced in step S76. It is determined whether or not there is a pass point that will be influenced by the moving in step S76, and all pass points that will be influenced by the pass point moved by the user are moved. When there is not a pass point that will be influenced, the determination result is No, and the process proceeds to step S77.

In step S77, a new route is generated considering this deletion, and the generation result is displayed. In step S78, it is determined whether or not the user is going to move another pass point. This determination is made, for example, on the basis of whether or not a new pass point has been selected. When the user has selected a new pass point, the determination result is Yes, and the process returns to step S72 in order to execute the processes in response to the selection. When the user has given an instruction to terminate the editing without selecting anything, the determination result is No, and a series of the processes are terminated after storing the pass point position table (FIG. 12) as necessary. When the user has given an instruction to store the editing result, the pass point position table is updated and stored. When the user has not given an instruction to store the editing result, the pass point position table is deleted.

In the present embodiment, the priorities of newly generated pass points are automatically set; however, it is also possible to employ a configuration in which the priorities are displayed so as to allow the user to change the priorities. Ways of generating, deleting, and moving pass points or a way of modifying attributes are not particularly limited, and various alterations are allowed as necessary.

In the present embodiment, linear structures whose routes are to be designed are harnesses and the target of the support of the route designing is an apparatus; all of these are treated as a single product as illustrated in FIG. 9 or 10. However, as long as they are deformable (or flexible), the linear structures may be an electric wire, a cable, etc., and also may be objects for allowing fluid such as air, liquid, or the like to flow through themselves or for allowing other linear structures to run through themselves. With three-dimensional design data, routes can be designed considering deformations in a virtual space. Accordingly, deformable narrow components that can be handled in a virtual space can be a target of the route design support.

Figure 27:
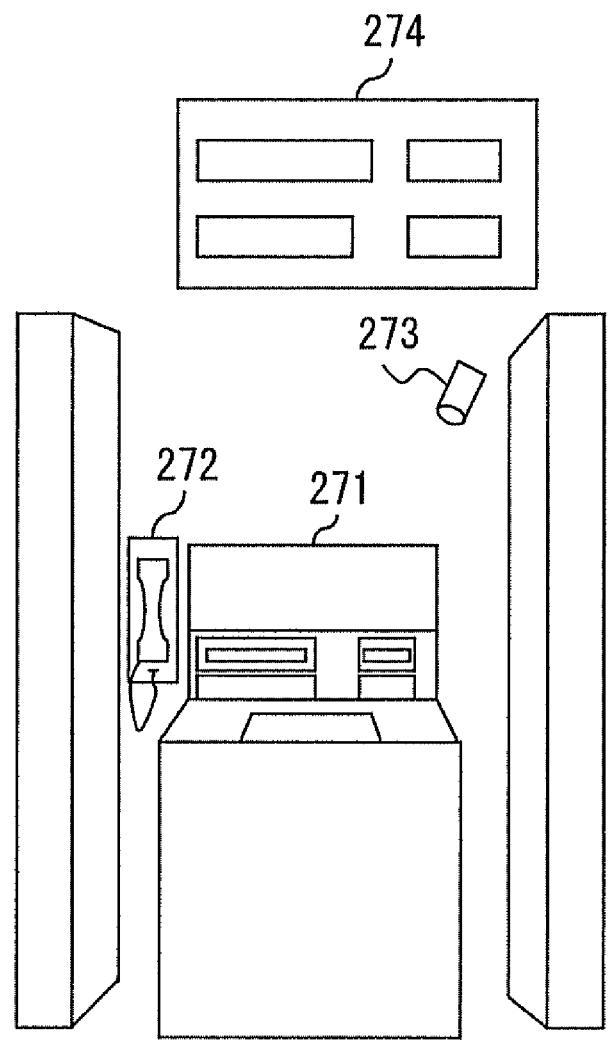
FIG. 27 is a front view of an apparatus provided for each automated machine 271.
Figure 28:
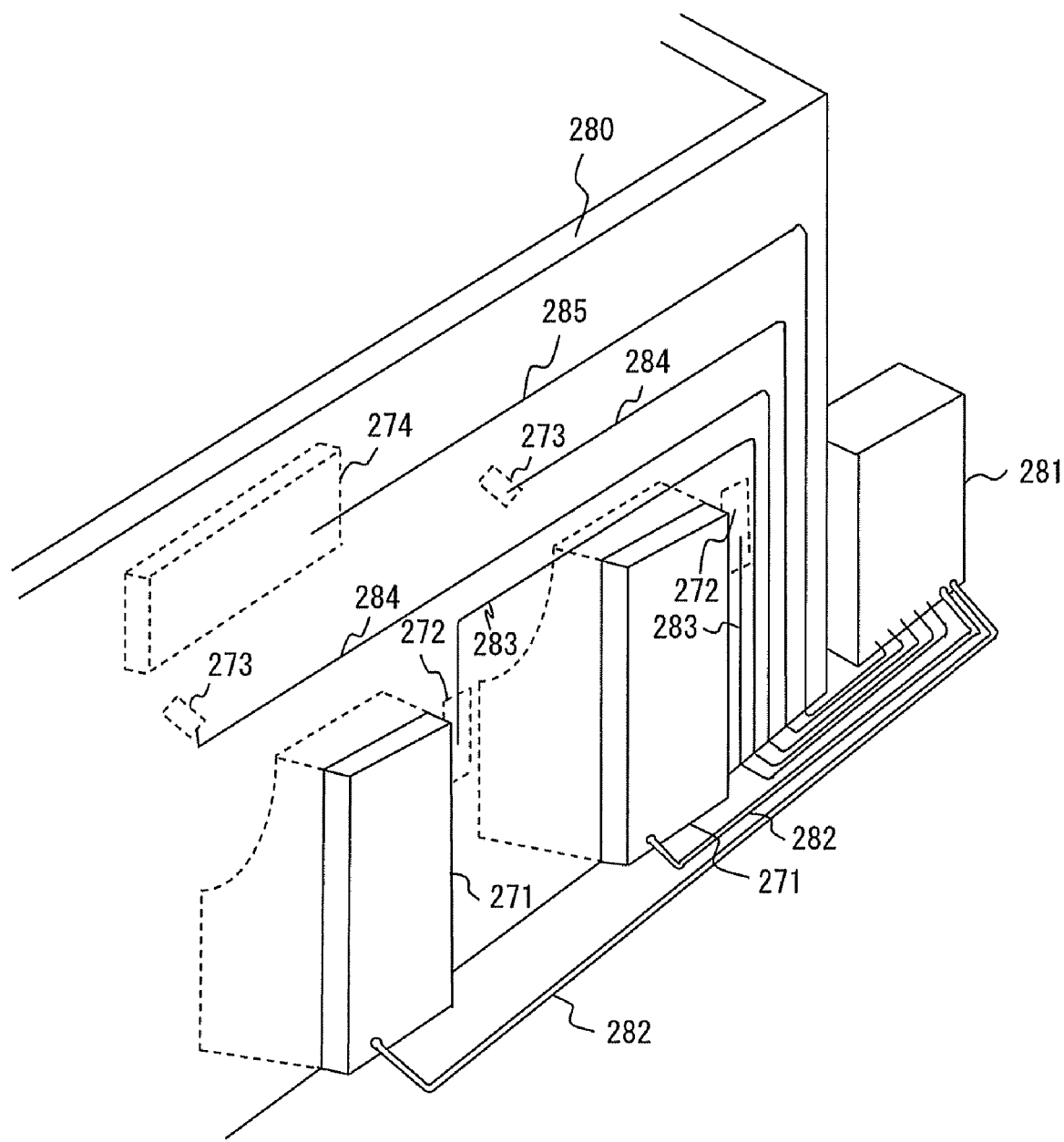
FIG. 28 illustrates a wiring configuration at the back of the automated machines 271.
Figure 29:
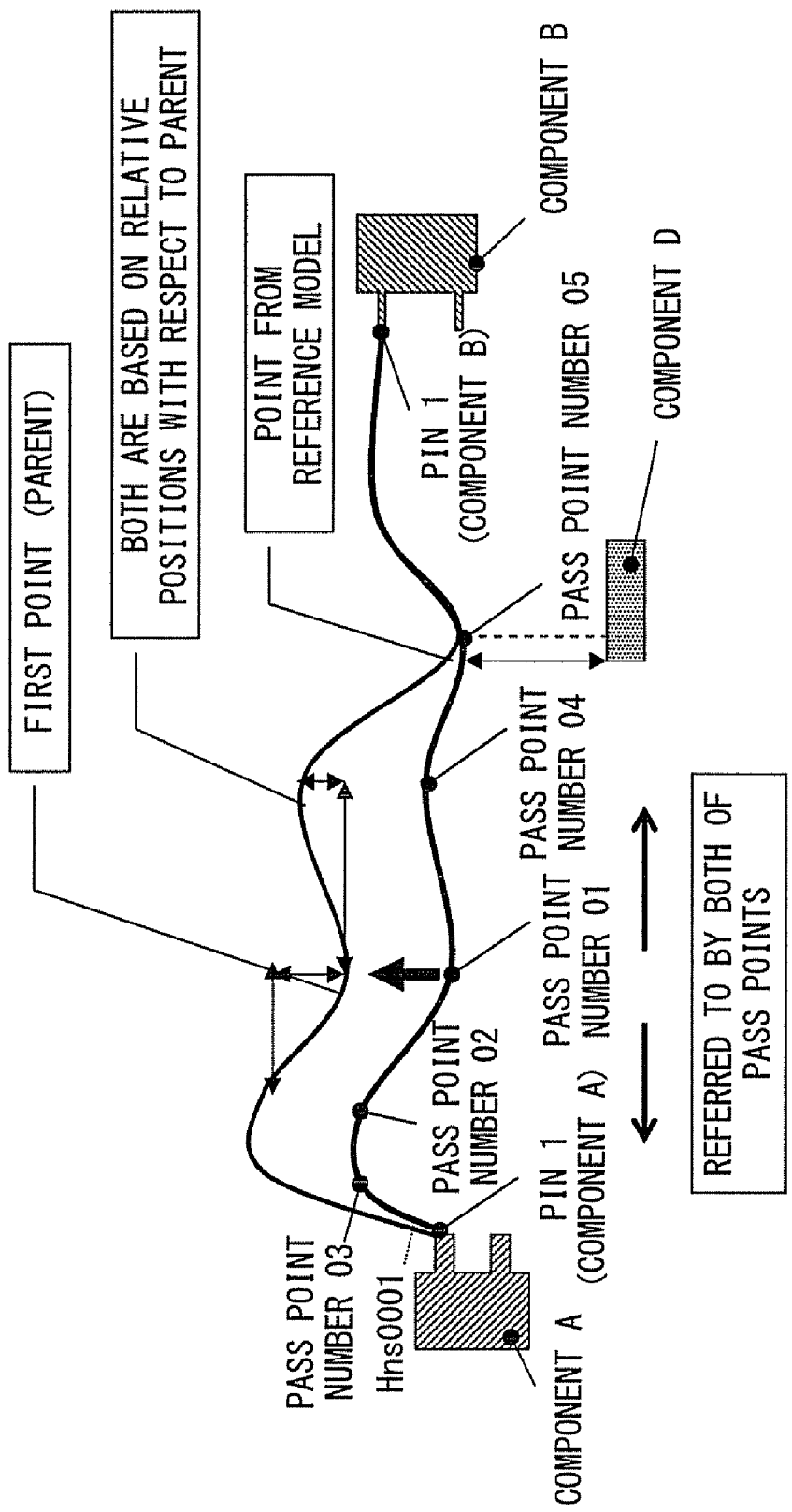
FIG. 29 illustrates a conventional technique of displaying pass points and position changes made to pass points of relative coordinates.

Targets of the route design support can be automobiles, motorcycles, automated machines except for a cash dispenser, or other apparatuses using linear structures, such as electronic products. As described below, a plurality of apparatuses disposed in separate places (such as apparatuses that are independently utilized to function as a single product) can be a target. This will be explained specifically by referring to FIGS. 27 and 28. FIGS. 27 and 28 illustrate an example of a case when a plurality of apparatuses are treated as a target. More specifically, this example is for a case when a plurality of automated machines such as ATMs or the like are to be set in a space in a building used by a financial facility such as a bank.

FIG. 27 is a front view of an apparatus provided for each of the automated machines 271. As illustrated in FIG. 27, each automated machine 271 has a telephone 272 for communications with clerks and a security camera 273. Numeral 274 denotes a display device for displaying information for customers using the automated machine 271.

FIG. 28 illustrates a wiring configuration at the back of the automated machines 271. As illustrated, each automated machine 271 is set with its back portion slightly projecting from a wall 280. The automated machine 271, the camera 273, and the display device 274 are provided on the wall 280. Numeral 281 denotes a server computer for controlling/managing these members. The server computer 281 is connected to another server computer (not illustrated) or to a host computer via a LAN (cable) or the like.

The respective automated machines 271 are connected to one another via the server computer 281 and cables 282. The telephones 272, the cameras 273, and the display device 274 are respectively connected to the server computer 281, via cables 283, 284, and 285. The entire cable 282 connected to the automated machines 271 is provided on the floor, and other cables 283 through 285 are partially adhered to the wall 280.

As illustrated in FIG. 28, the route design in which a plurality of apparatuses 271 through 274 and 281 are connected to one another via the cables 282 through 285 can be performed in the virtual space by preparing design data of the apparatuses 271 through 274 and 281 and dimension data (three-dimensional data) of the wall 280 and the floor, and treating the portions on the wall 280 for passing the cable as a component set as the starting point or the ending point. Thereby, a plurality of apparatuses can be a target of a route design for a linear structure. The target apparatuses do not have to be provided on the same floor. In other words, a plurality of apparatuses disposed on different floors can be a target.

The invention claimed is:

1. A design support system for supporting a route design operation for providing a deformable linear structure to a target, said system comprising:
　a memory; and
　a processing unit including:
　　an editing unit to perform an editing process including generation, modification, and deletion of pass point through which the linear structure should pass in a virtual space in accordance with an operation of an input device by a user, by using the memory;
　　a position management unit to manage a position of the pass point generated by the editing unit by using a plurality of position references for identifying the position; and
　　a priority management unit to manage priority of the plurality of position references for each pass point, and to cause the position management unit to manage, in accordance with the priority, a position of a pass point whose position has to be changed by an editing process when the editing unit performs the editing process in accordance with an operation of the input device by a user.

2. The design support system according to claim 1, the processing unit further including:
　a passing direction management unit to manage whether or not to fix a passing direction, for each pass point, of the linear structure passing through the pass point in accordance with an instruction given by a user through an operation of the input device.

3. The design support system according to claim 1, the processing unit further including:
　a reference coordinate management unit to manage, for each pass point, reference coordinates for identifying a passing direction of the linear structure passing through the pass point in accordance with an instruction given by a user through an operation of the input device.

4. The design support system according to claim 1, the processing unit further including:

a display control unit to make displayed content of the pass point different in accordance with the priority managed by the priority management unit.

5. The design support system according to claim 1, wherein:
the target is one or more apparatuses handled separately.

6. A method of supporting, by using a computer, a route design operation for providing a deformable linear structure to a target, said method comprising:
performing an editing process including generation, modification, and deletion of pass point through which the linear structure should pass in a virtual space in accordance with an operation of an input device by a user;
managing, by using a computer, a position of the pass point generated in the editing process by using a plurality of position references for identifying the position; and
managing, by using the computer, priority of the plurality of position references for each pass point, and managing, in accordance with the priority, the position of the pass point whose position has to be changed by an editing process when the editing process is performed in accordance with an operation of the input device by a user.

7. The design support method according to claim 6, further comprising:
managing whether or not to fix a passing direction, for each pass point, of the linear structure passing through the pass point in accordance with an instruction given by a user through an operation of the input device.

8. The design support method according to claim 6, further comprising:
managing, for each pass point, reference coordinates for identifying a passing direction of the linear structure passing through the pass point in accordance with an instruction given by a user through an operation of the input device.

9. The design support method according to claim 6, further comprising:
managing, for each of the pass points, an attribute representing a type of the pass point designated by a user through an operation of the input device; and
making displayed content of the pass points different in accordance with the attributes.

10. The design support method according to claim 6, wherein:
the target is one or more apparatuses handled separately.

11. A non-transitory storage medium storing a program for causing a computer used to construct a design support system for supporting a route design operation for providing a deformable linear structure to a target to implement:
an editing function of performing an editing process including generation, modification, and deletion of pass points through which the linear structure should pass in a virtual space in accordance with an operation of an input device by a user;
a position management function of managing a position of a pass point generated by the editing function by using a plurality of position references for identifying the position; and
a priority management function of managing priorities of the plurality of position references for each of the pass points, and causing the editing function to manage, in accordance with the priority, a position of a pass point whose position has to be changed by an editing process when the editing function performs the editing process in accordance with an operation of the input device by a user.

12. The non-transitory storage medium according to claim 11, further causing the computer to implement:
a passing direction management function of managing whether or not to fix a passing direction, for each of the pass points, of the linear structure passing through the pass point in accordance with an instruction given by a user through an operation of the input device.

13. The non-transitory storage medium according to claim 11, further causing the computer to implement:
a reference coordinate management function of managing, for each of the pass points, reference coordinates for identifying a passing direction of the linear structure passing through the pass point in accordance with an instruction given by a user through an operation of the input device.

14. The non-transitory storage medium according to claim 11, further causing the computer to implement:
an attribute management function of managing, for each of the pass points, an attribute representing a type of the pass point designated by a user through an operation of the input device; and
a display control function of making displayed content of the pass points different in accordance with the attributes managed by the attribute management function.

\* \* \* \* \*